(12) United States Patent
Yoshima et al.

(10) Patent No.: US 10,938,020 B2
(45) Date of Patent: Mar. 2, 2021

(54) ELECTRODE, LAMINATE, LITHIUM ION SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Kazuomi Yoshima, Yokohama (JP); Yasunobu Yamashita, Tokyo (JP); Yasuhiro Harada, Isehara (JP); Norio Takami, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 87 days.

(21) Appl. No.: 16/289,009

(22) Filed: Feb. 28, 2019

(65) Prior Publication Data
US 2020/0091499 A1    Mar. 19, 2020

(30) Foreign Application Priority Data

Sep. 19, 2018  (JP) ............................. JP2018-174721

(51) Int. Cl.
*H01M 4/131*    (2010.01)
*H01M 10/0525*  (2010.01)
(Continued)

(52) U.S. Cl.
CPC ............... *H01M 4/131* (2013.01); *B60L 7/10* (2013.01); *B60L 50/64* (2019.02); *H01M 4/62* (2013.01);
(Continued)

(58) Field of Classification Search
CPC ......... H01M 10/0562; H01M 10/0525; H01M 10/052; H01M 4/131; H01M 4/62; H01M 10/0566
See application file for complete search history.

(56) References Cited

U.S. PATENT DOCUMENTS

| 2010/0086849 | A1* | 4/2010 | Mizuno ............... H01M 4/9008 429/209 |
| 2015/0357639 | A1 | 12/2015 | Morimoto et al. |

(Continued)

FOREIGN PATENT DOCUMENTS

| JP | 2008-210791 | 9/2008 |
| JP | 2014-146554 | 8/2014 |

(Continued)

OTHER PUBLICATIONS

Gasmi et al. (Journal of Sol-Gel Science and Technology, 4, 231-237 (1995)).*

*Primary Examiner* — Olatunji A Godo
(74) *Attorney, Agent, or Firm* — Oblon, McClelland, Maier & Neustadt, L.L.P.

(57) ABSTRACT

According to one embodiment, an electrode is provided. The electrode includes an active material-containing layer including active material particles and solid electrolyte particles being present away from the active material particles. The active material particles have lithium ion conductivity. The solid electrolyte particles have first ion conductivity. The solid electrolyte particles include a first ion that is at least one selected from the group consisting of an alkali metal ion excluding a lithium ion, a Ca ion, an Mg ion, and an Al ion.

18 Claims, 11 Drawing Sheets

(51) Int. Cl.
- *H01M 4/62* (2006.01)
- *H01M 10/0562* (2010.01)
- *H01M 10/0566* (2010.01)
- *H01M 10/42* (2006.01)
- *B60L 7/10* (2006.01)
- *B60L 50/64* (2019.01)
- *H01M 4/02* (2006.01)
- *H01M 4/505* (2010.01)
- *H01M 4/525* (2010.01)

(52) U.S. Cl.
CPC ... *H01M 10/0525* (2013.01); *H01M 10/0562* (2013.01); *H01M 10/0566* (2013.01); *H01M 10/4257* (2013.01); *H01M 4/505* (2013.01); *H01M 4/525* (2013.01); *H01M 2004/028* (2013.01); *H01M 2010/4271* (2013.01); *H01M 2220/20* (2013.01); *H01M 2300/0037* (2013.01)

(56) References Cited

U.S. PATENT DOCUMENTS

| | | |
|---|---|---|
| 2016/0043430 A1* | 2/2016 | Lee ............. H01M 10/0562 429/322 |
| 2018/0277896 A1 | 9/2018 | Yoshima et al. |
| 2019/0260075 A1 | 8/2019 | Yoshima et al. |

FOREIGN PATENT DOCUMENTS

| | | |
|---|---|---|
| JP | 2015-88369 | 5/2015 |
| JP | 2018-156903 | 10/2018 |
| JP | 2019-145264 A | 8/2019 |

* cited by examiner

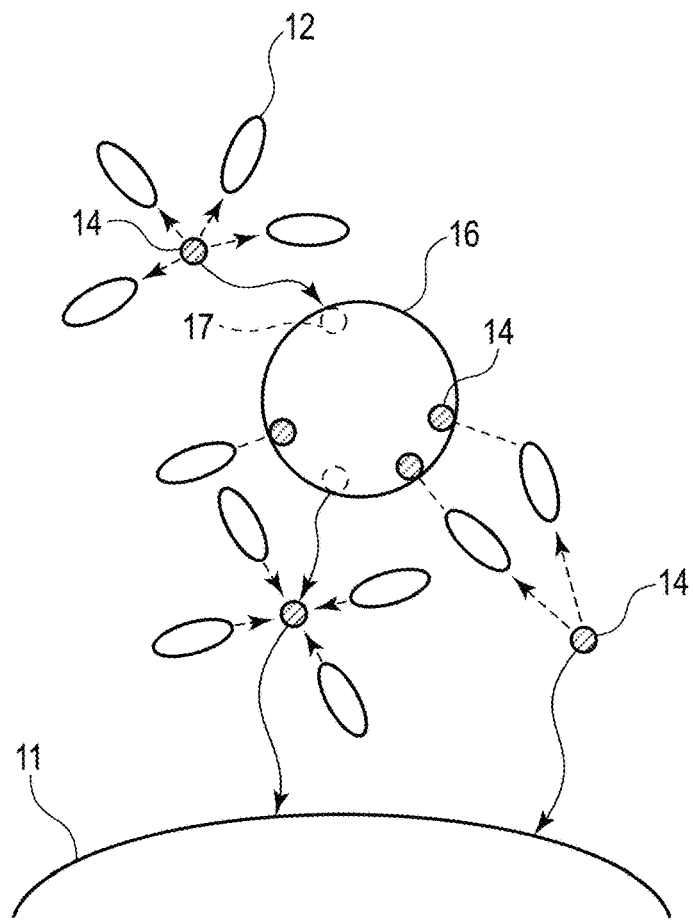
F I G. 2
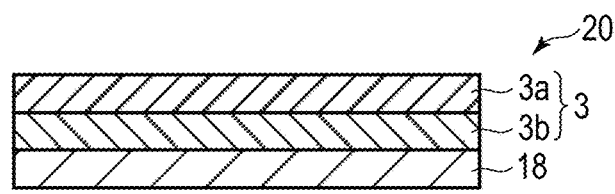
F I G. 3
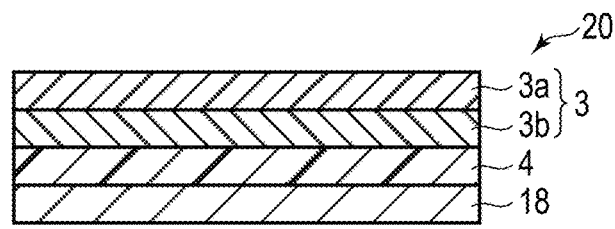
F I G. 4

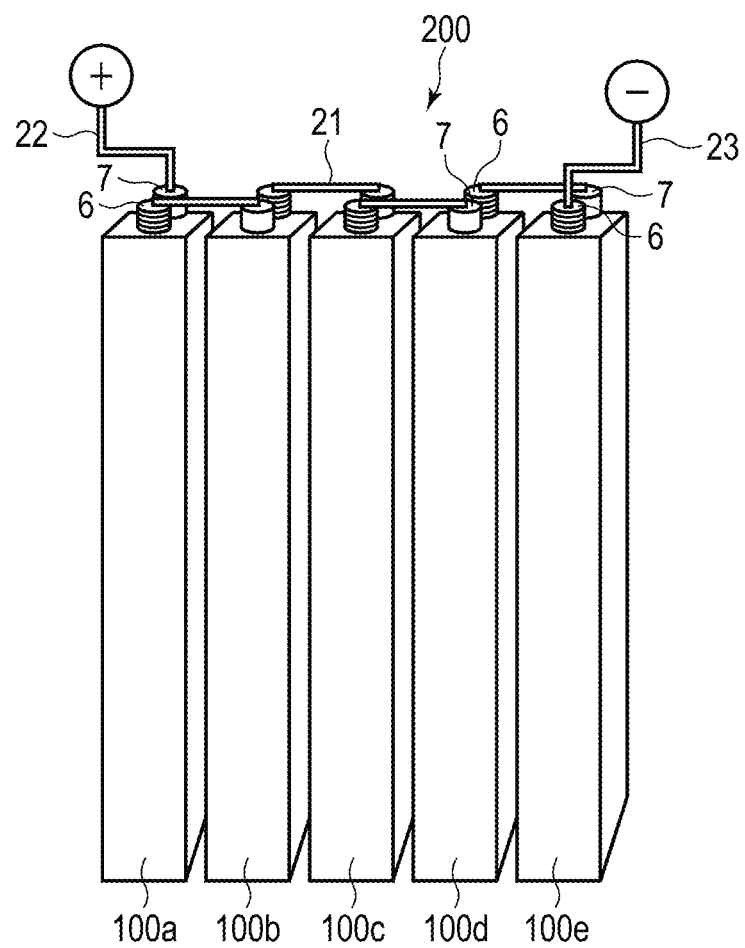
F I G. 9

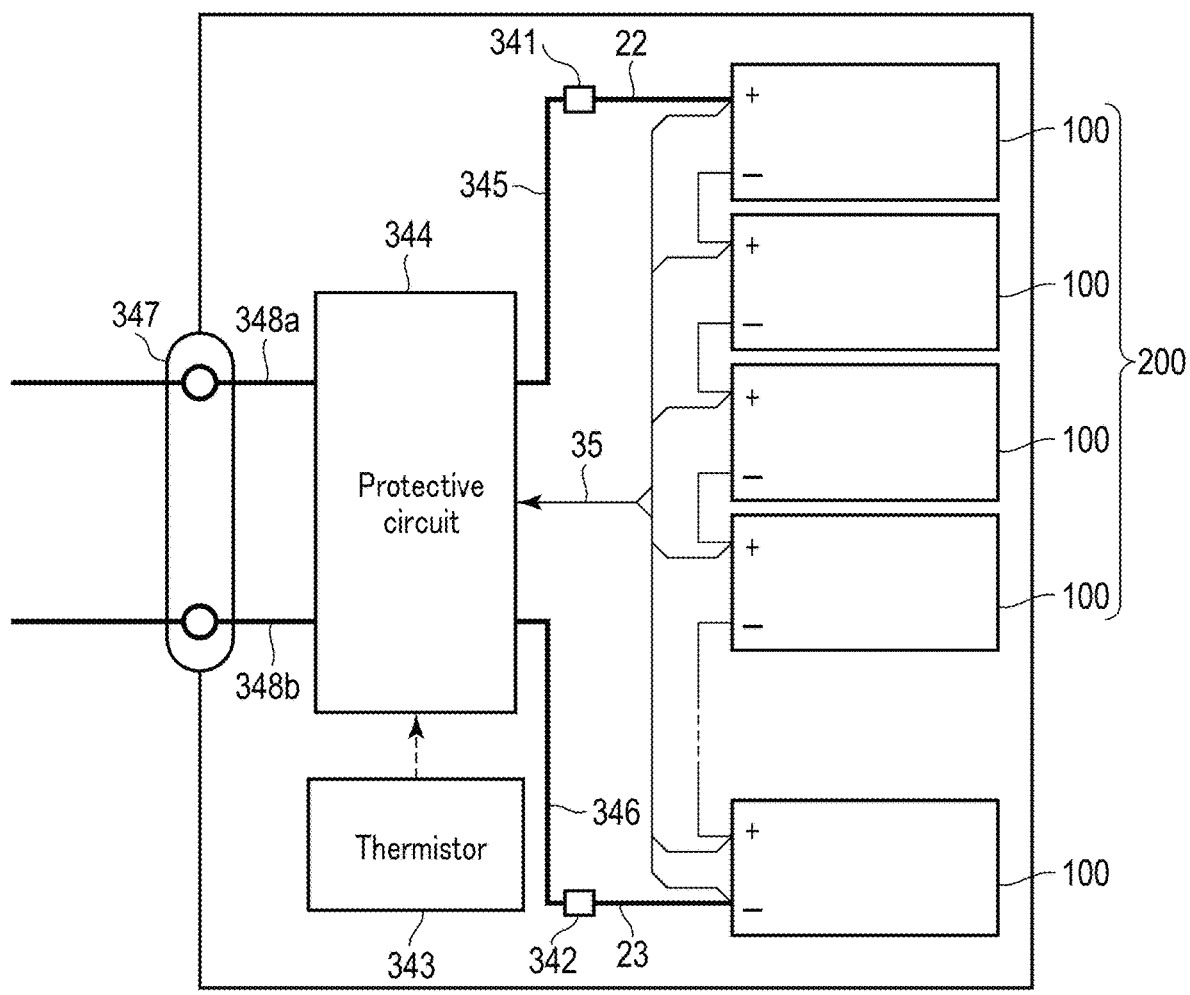
F I G. 11
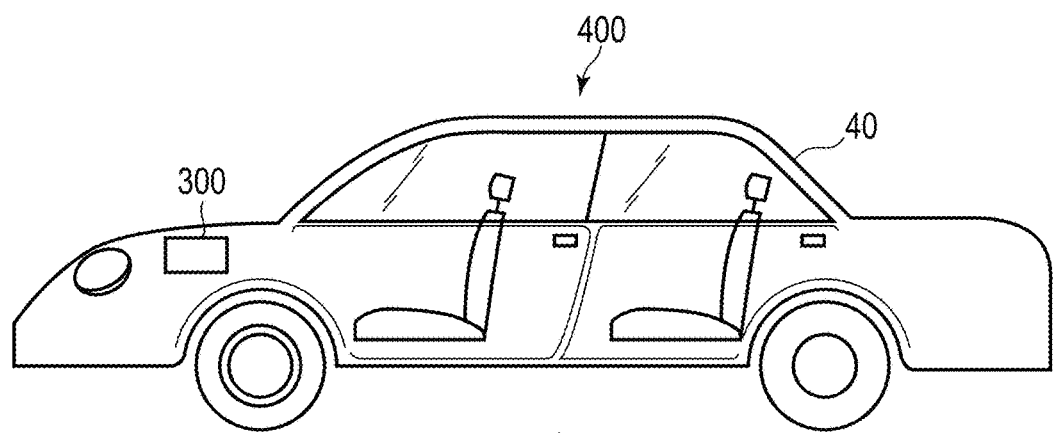
F I G. 12

# ELECTRODE, LAMINATE, LITHIUM ION SECONDARY BATTERY, BATTERY PACK, AND VEHICLE

CROSS-REFERENCE TO RELATED APPLICATIONS

This application is based upon and claims the benefit of priority from Japanese Patent Application No. 2018-174721, filed Sep. 19, 2018, the entire contents of which are incorporated herein by reference.

FIELD

Embodiments described herein relate generally to an electrode, a laminate, a lithium ion secondary battery, a battery pack, and a vehicle.

BACKGROUND

In recent years, research and development on secondary battery such as a lithium ion secondary battery and non-aqueous electrolyte secondary batteries as high energy density batteries have been gathered pace. The secondary battery have been expected as power sources for in-vehicle power supply for hybrid automobiles and electric automobiles or uninterruptive power supply for mobile telephone base stations. Among such secondary batteries, many studies have been focusing on all-solid lithium ion secondary battery for in-vehicle battery. All-solid lithium ion secondary battery have been attracting attention for its excellent safety.

The all-solid lithium ion secondary battery using a solid electrolyte may be less likely to ignite than the lithium ion secondary battery using nonaqueous electrolyte. At present, however, all-solid, high-capacity, lithium ion secondary battery is yet to be available for practical use. One of the difficulties with the all-solid type may be that the interface resistance between the solid electrolyte and active material is high. Since the solid electrolyte and the active material are both solid, welding them each other may be relatively easy under heat. However, the active material may expand and contract correspondingly to lithium insertion and extraction. The active material, therefore, is likely to detach from the solid electrolyte when charge and discharge are repeatedly performed. Then, favorable charge-and-discharge cycle may be difficult to achieve.

Thus, it is considered necessary to reduce adverse impact from expansion and contraction of the active material and to form an adequate interface between the solid electrolyte and active material.

BRIEF DESCRIPTION OF THE DRAWINGS

FIG. 2 is a schematic drawing of Li ion conduction in an active material-containing layer according to a reference example;

FIG. 3 is a schematic view in cross section that illustrates an example of a laminate according to a second embodiment;

FIG. 4 is a schematic view in cross section that illustrates an example of another laminate according to the second embodiment;

FIG. 9 is a schematic perspective view that illustrates an example of a battery module according to the third embodiment;

FIG. 11 is a block diagram that illustrates an example of an electric circuit in the battery pack illustrated in FIG. 10;

FIG. 12 is a schematic view in cross section that illustrates an example of a vehicle according to a fifth embodiment;

DETAILED DESCRIPTION

According to the first embodiment, an electrode is provided. The electrode includes an active material-containing layer including active material particles and solid electrolyte particles being present away from the active material particles. The active material particles have lithium ion conductivity. The solid electrolyte particles have first ion conductivity. The solid electrolyte particles include a first ion that is at least one selected from the group consisting of an alkali metal ion excluding a lithium ion, a Ca ion, an Mg ion, and an Al ion.

According to the second embodiment, a laminate is provided. The laminate includes a solid electrolyte layer and an electrode including an active material-containing layer. The active material-containing layer includes active material particles having lithium ion conductivity. The solid electrolyte layer includes solid electrolyte particles having first ion conductivity that are present away from the active material particles. A first ion may be at least one selected from the group consisting of an alkali metal ion excluding lithium ion, a Ca ion, an Mg ion, and an Al ion.

According to the third embodiment, a lithium ion secondary battery is provided. The lithium ion secondary battery includes a nonaqueous electrolyte and the electrode according to the first embodiment. The lithium ion secondary battery may instead include a nonaqueous electrolyte and the laminate according to the second embodiment.

According to the fourth embodiment, a battery pack is provided. The battery pack includes the lithium ion secondary battery according to the third embodiment.

According to the fifth embodiment, a vehicle is provided. The vehicle includes the battery pack according to the fourth embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to the first embodiment, an electrode is provided. The electrode includes an active material-containing layer including active material particles and solid electrolyte particles being present away from the active material particles. The active material particles have lithium ion conductivity. The solid electrolyte particles have first ion conductivity. The solid electrolyte particles include a first ion that is at least one selected from the group consisting of an alkali metal ion excluding a lithium ion, a Ca ion, an Mg ion, and an Al ion.

Figure 1:
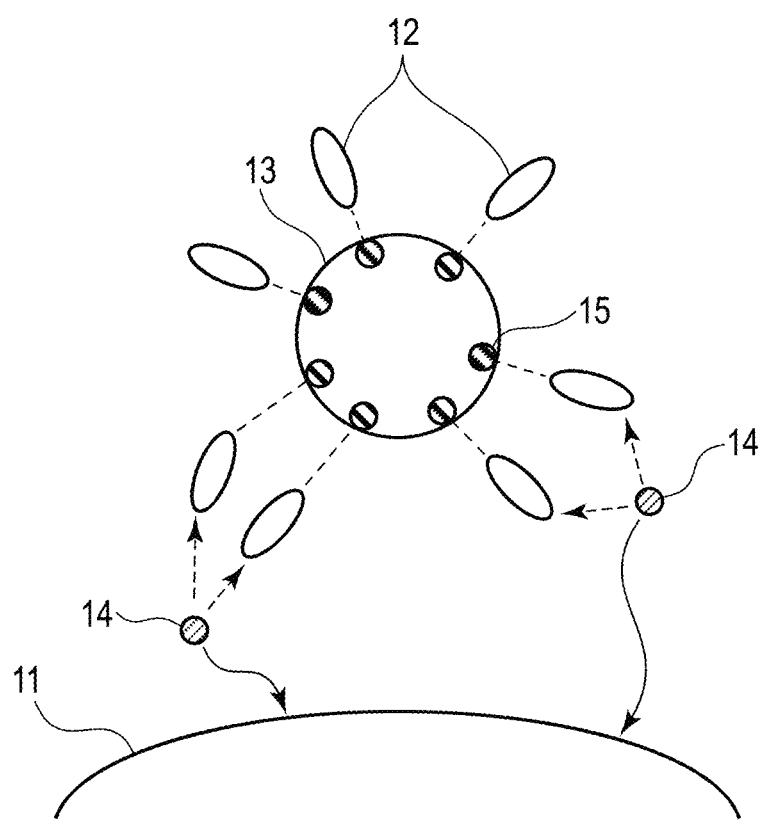
FIG. 1 is a schematic drawing of Li ion conduction in an active material-containing layer according to an embodiment.

Referring to FIGS. 1 and 2, the reasons why a lithium ion secondary battery that excels in rate characteristics and low-temperature characteristics is feasible by the electrode according to the embodiment will be described. FIG. 1 is a schematic drawing of lithium ion conduction in the active material-containing layer according to the embodiment. FIG. 2 is a schematic drawing of lithium ion conduction in an active material-containing layer according to a reference example.

The active material-containing layer according to the embodiment may hold a nonaqueous electrolyte. FIGS. 1 and 2 illustrate an examples of the active material-containing layers including a nonaqueous electrolyte solution or a nonaqueous electrolyte, for example, a gel electrolyte. FIGS. 1 and 2 show an active material particle 11. The active material particle 11 is either one of a positive electrode active material particle or a negative electrode active material particle. FIG. 1 further shows a solid electrolyte particle 13 having first ion conductivity, solvent molecules 12, lithium ions 14, and first ions 15. FIG. 2 shows, in addition to the active material particle 11, a solid electrolyte particle 16 having lithium ion conductivity, solvent molecules 12, and lithium ions 14.

First, lithium ion conduction in the active material-containing layer according to the reference example is described referring to FIG. 2.

Generally, during charge of the lithium ion secondary battery, lithium ions in solvated state with the solvent molecules included in the nonaqueous electrolyte are transported from the positive electrode side to the negative electrode side, and then inserted in the negative electrode active material particle. On the other hand, during discharge of the lithium ion secondary battery, lithium ions in solvated state with the solvent molecules included in the nonaqueous electrolyte are transported from the negative electrode side to the positive electrode side, and then inserted in the positive electrode active material particle.

After abundant lithium ions are inserted in the negative electrode active material particles or positive electrode active material particles, the solvent molecules transported with the lithium ions by the solvation are gathered around the surfaces of the active material particles. This means that the concentration of free solvent which is non-solvated increases in the vicinity of the surfaces of the active material particles. Lithium ions in solvated state may be difficult to flow into any part where the solvent concentration is high. Also, since abundant lithium ions are already inserted in the negative electrode active material particles or positive electrode active material particles, concentration polarization may be occurring. Therefore, inserting more lithium ions in the active material particles may be difficult.

In the state that the concentration polarization is occurring and the solid electrolyte particles 16 having lithium ion conductivity is present, as illustrated in FIG. 2, when the lithium ions in solvated state are flowing toward the negative electrode side or positive electrode side, the lithium ions may be desolvated in the vicinity of the solid electrolyte particles 16 having lithium ion conductivity. The desolvated lithium ions 14 is inserted in a lithium ion insertion sites 17 in the solid electrolyte particles 16 having lithium ion conductivity. The lithium ions 14 extracted later from the lithium ion insertion site 17 are solvated again and then desolvated, and then inserted in the active material particles 11. Supposing that significant concentration polarization is occurring between the positive electrode and the negative electrode, the solid electrolyte particles 16 having lithium ion conductivity, if present, may accelerate insertion of the lithium ions 14 into the active material particles 11. As a result, rate characteristics and low-temperature characteristics may be improved.

In addition to the effect described above, the solid electrolyte particles 16 having lithium ion conductivity is considered to exhibit an action described below. On the surfaces of the active material particles 11 where free solvents which is non-solvated are present at a higher concentration, the solvent molecules 12 may be adsorbed to the solid electrolyte particles 16 having lithium ion conductivity. FIG. 2 shows an example in which three solvent molecules 12 are adsorbed to the solid electrolyte particle 16 having lithium ion conductivity. This may lower the concentration of free solvents on the surfaces of the active material particles 11 and may also facilitate desolvation of the lithium ions in solvated state. The lithium ions 14, therefore, may be more readily inserted in the active material particles 11. In other words, insertion of the lithium ions 14 into the active material particles 11 is facilitated and rate characteristics and low-temperature characteristics are improved.

The inventors of the present application were led to the finding that the latter action had a greater impact. Specifically, the inventors found that adsorption of the solvent molecules to the solid electrolyte particles present in the vicinity of active material particles may greatly conduce to improvements of rate characteristics and low-temperature characteristics.

Here, FIG. 1 that schematically shows lithium ion conduction in the active material-containing layer according to the embodiment will be discussed below.

The solid electrolyte particles 13 having first ion conductivity have a plurality of first ions 15. These first ions 15 are not involved in electrode reactions in the lithium ion secondary battery. During charge and discharge, therefore, most of the first ions 15 may stay within the solid electrolyte particles 13 having first ion conductivity. When the solvent molecules 12 is adsorbed to the solid electrolyte particles 13 having first ion conductivity, a part with negative polarity of the solvent molecule 12 may be adsorbed to the positive charge of the first ions 15. Therefore, when a large number of first ions 15 are present in the solid electrolyte particles 13 having first ion conductivity, the number of the solvent molecules 12 capable of being adsorbed to the solid electrolyte particles 13 having first ion conductivity is large.

In the active material-containing layer according to the reference example illustrated in FIG. 2, on the other hand, the solid electrolyte particles present in the vicinity of the active material particles 11 have lithium ion conductivity. Therefore, the lithium ions 14 itself, which are present in the solid electrolyte particle 16 having lithium ion conductivity, may be extracted from or inserted in the solid electrolyte particle 16 during charge and discharge. Thus-, the number of solvent molecules capable of being adsorbed to the solid electrolyte particles 16 having lithium ion conductivity may be estimated to be smaller than the number of solvent molecules capable of being adsorbed to the solid electrolyte particles 13 having first ion conductivity.

FIG. 1 shows an example in which seven solvent molecules 12 are adsorbed to the solid electrolyte particle 13 having first ion conductivity. For insertion of the lithium ions 14 solvated and transported to the vicinity of the active material particle 11 into the active material particle 11, the lithium ions 14 needs to be desolvated. In the example illustrated in FIG. 1, the solvent molecules 12 remained after the desolvation may readily adsorb to the solid electrolyte particle 13 having first ion conductivity, as compared with the example of FIG. 2 in which the solid electrolyte particle 16 having lithium ion conductivity is present in the vicinity of the active material particle 11. Hence, insertion of the lithium ions 14 into the active material particle 11 may be further accelerated in the example of FIG. 1 than in the example of FIG. 2. That is to say, the active material-containing layer containing the solid electrolyte particles having first ion conductivity may allow more accelerated insertion of the lithium ions 14 into the active material particle 11. This effect may be elicited in both the positive electrode and negative electrode.

However, the solid electrolyte particles 13 having first ion conductivity should preferably have no contact with the active material particles 11. In case the solid electrolyte particles 13 having first ion conductivity is in contact with the active material particles 11, the solvent molecules 12 adsorbable to the solid electrolyte particles 13 having first ion conductivity may decrease. Besides that, the solid electrolyte particles 13 having first ion conductivity may block a conduction path for the lithium ions 14. These unfavorable events may result in poor rate characteristics and low-temperature characteristics.

Hence, it is required of the active material-containing layer to include the solid electrolyte particles 13 having first ion conductivity that are present away from the active material particles 11. The solid electrolyte particles 13 having first ion conductivity may be present away from the active material particles 11 in the presence of, for example, a conductive agent or a binder between these particles. The number of solid electrolyte particles having first ion conductivity with no contact with the active material particles are preferably as large as possible among all of the solid electrolyte particles having first ion conductivity that are included in the active material-containing layer.

Whether the solid electrolyte particles having first ion conductivity are away from the active material particles may be determined through observation using a scanning electron microscope (SEM). Apart from the SEM observation, inductively coupled plasma (ICP) analysis may be performed to identify compositions of the active material particles and the solid electrolyte particles having first ion conductivity.

<Observation of Scanning Electron Microscope (SEM)>

First, the secondary battery is set in a fully-discharged state. For example, the battery is repeatedly discharged a plurality of times 0.1 C current under an environment of 25° C. until a rated terminal voltage or a battery voltage reaches 1.0 V such that a current value at the time of discharging is 1/100 of the rated capacity or lower, whereby the battery can be set in the fully-discharged state. There is a case where there are lithium ions remaining even in the discharged state.

The secondary battery with the built-in electrode in the fully-discharged state (State of Charge: 0%) is disassembled in a glove box filled with argon. The electrode to be measured is taken out from the disassembled secondary battery. This electrode is washed with an appropriate solvent. For example, ethyl methyl carbonate or the like is preferably used as the solvent used for washing. If washing is insufficient, there is a case where it is difficult to observe particles due to the influence of lithium carbonate, lithium fluoride, or the like remaining in the electrode. The washed electrode is put in an appropriate solvent, and the resultant is irradiated with ultrasonic waves. For instance, the electrode is immersed in ethyl methyl carbonate in a glass beaker, and the beaker is vibrated in an ultrasonic cleaner to detach the active material-containing layer from the current collector. Next, the detached active material-containing layer is dried under reduced pressure. Then, the dried active material-containing layer is pulverized in a mortar to obtain a powder containing measurement targets; active material particles, solid electrolyte particles having first ion conductivity, conductive agent, binder, and the like.

Next, approximately 10 mg of the obtained powder is adhered to an electrically conductive tape, for example, a carbon tape, attached to the SEM sample table. The adhered powder is observed with the SEM to obtain an SEM image. In the SEM measurement, the powder is observed at 20,000-fold magnification. Preferably, inert atmosphere may be maintained at the time of introducing the powder to be measured into a sample chamber.

When the SEM image obtained through the SEM observation shows any active material particle to which no solid electrolyte particles having first ion conductivity is attached, it may be determined that, in the electrode included in a battery before being dissembled, solid electrolyte particles having first ion conductivity are present away from the active material particles.

The ratio of an area occupied by the solid electrolyte particles having first ion conductivity may preferably be 20% or less, and more preferably be 10% or less of a total visual field area of the SEM image obtained through the observation at 20,000-fold magnification. The area ratio may be 0%. The total visual field area of the SEM image is calculated as a two-dimensional area. Supposing that the visual field of the SEM image is 15×15 μm square, the total visual field area of the SEM image is 225 μm. The area occupied by the solid electrolyte particles having first ion conductivity is also calculated as a two-dimensional area, instead of a surface area of the particles. To calculate the area ratio of the solid electrolyte particles having first ion conductivity to the total visual field area of the SEM image, the ratios at five observation spots randomly changed are obtained, and an average of the obtained values is used as the area ratio.

When the area ratio be measured, an electron probe micro analyzer (EPMA) in combination of the SEM allow the active material particles and the solid electrolyte particles having first ion conductivity to be separately mapped. The area ratios of the active material particles and of the solid electrolyte particles having first ion conductivity to the total vision field area may be quantitatively calculated by performing an image process subsequent to the mapping. In the image process, for example, the active material particles and the solid electrolyte particles having first ion conductivity are extracted and mutually evaluated.

Assuming that the solid electrolyte particles having first ion conductivity in the active material-containing layer have a constant weight, it may be determined that a greater number of solid electrolyte particles having first ion conductivity have no contact with the active material particles in the active material-containing layer, with a smaller area ratio of the solid electrolyte particles having first ion conductivity to the total visual field area of the SEM image. It may be thus determined because, as a result of pretreatment prior to the SEM observation, any contactless active material particles and solid electrolyte particles having first ion conductivity in the active material-containing layer may be separated from each other in the powder to be measured. In the powder under observation, the active material particles may be mostly visually confirmed, while the solid electrolyte particles having first ion conductivity may be hardly observable.

Figure 16:
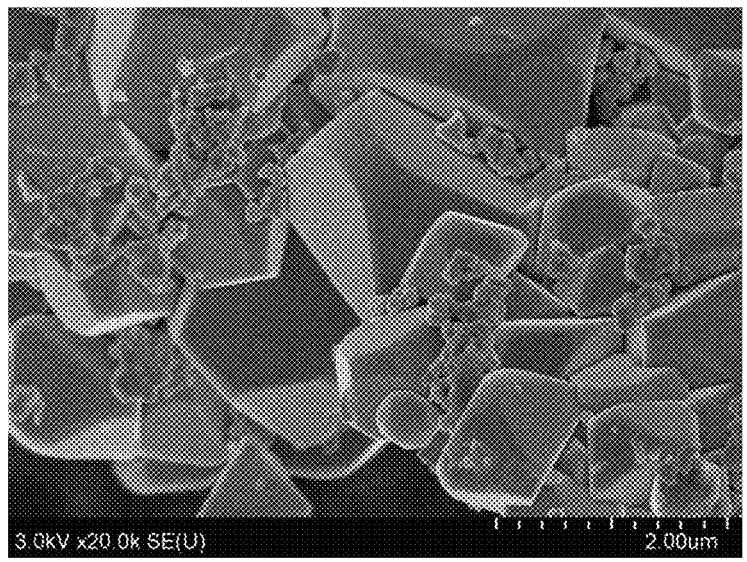
FIG. 16 is an SEM image according to the comparative example 2.
Figure 17:
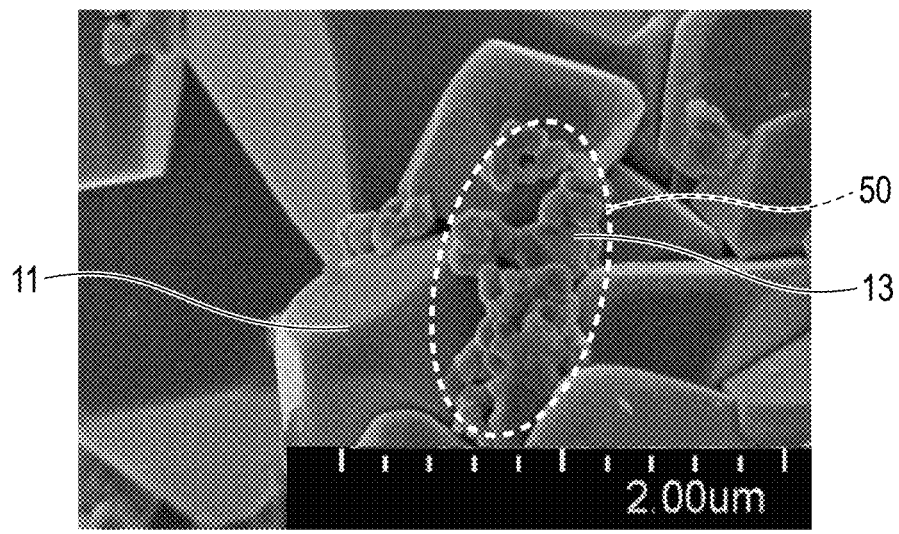
FIG. 17 is the SEM image of FIG. 16 enlarged in part.
Figure 18:
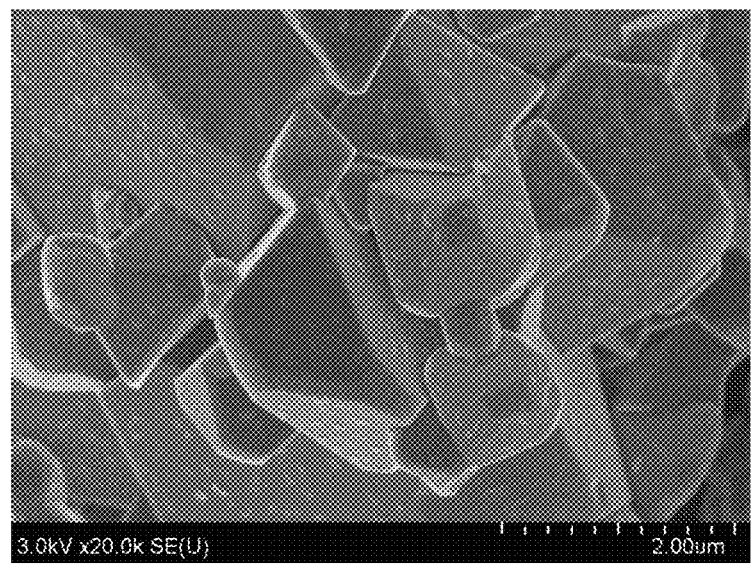
FIG. 18 is an SEM image according to the comparative example 5.
Figure 19:
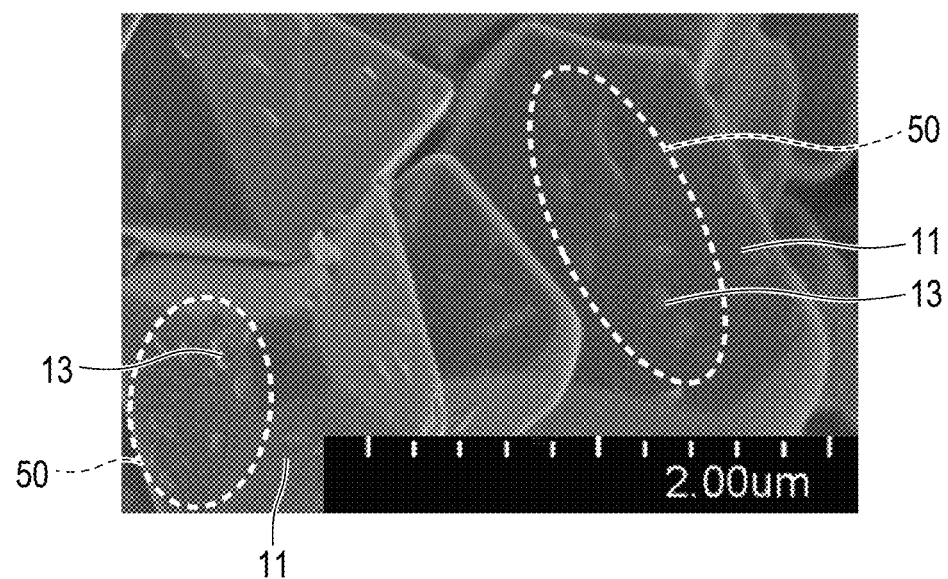
FIG. 19 is the SEM image of FIG. 18 enlarged in part.

Supposing there is contact between the solid electrolyte particles having first ion conductivity and the active material particles that are included in the active material-containing layer, the observation may reveal that, even after the pretreatment described earlier, the solid electrolyte particles having first ion conductivity are adhered to a large number of active material particles, as illustrated in FIGS. 16 and 17 related to comparative example 2, and FIGS. 18 and 19 related to example 5, which will be described later. In this instance, the solid electrolyte particles having first ion conductivity account for a large portion of the visual field area of the SEM image.

The ratio of the active material particles with no contact with the solid electrolyte particles having first ion conductivity to the total number of active material particles present in the visual field may be calculated by analyzing the SEM image. To calculate the ratio of the active material particles with no contact with the solid electrolyte particles having first ion conductivity to the total number of active material particles present in the visual field, the ratios at five observation spots randomly changed are obtained, and an average of the obtained values is used as the ratio. This ratio may be calculated by performing SEM-EDX analysis using energy dispersive X-ray spectrometry (EDX) together. The ratios at different observation spots may be calculated by the combination of the SEM image and an element mapping image obtained by the SEM-EDX analysis.

The ratio of the active material particles with no contact with the solid electrolyte particles having first ion conductivity to the total number of active material particles present in the visual field of the SEM image may preferably be 80% or more, and more preferably be 90% or more. This ratio may be 100%. When the ratio is high, rate characteristics and low-temperature characteristics tend to excellent, because the solid electrolyte particles having first ion conductivity may be unlikely to block a conduction path for lithium ions, and the solvent molecules may be easily adsorbed to the solid electrolyte particles having first ion conductivity.

<Inductively Coupled Plasma (ICP) Analysis>

The compositions of the solid electrolyte particles having first ion conductivity and the active material particles that are included in the active material-containing layer may be known through emission spectrochemical analysis in which inductively coupled plasma (ICP) is used as light source.

The ICP analysis can identify the metallic composition ratio of the solid electrolyte particle included in the electrode. Also, the weight ratio of the solid electrolyte particles having first ion conductivity to the weight of the active material-containing layer may be measured through the ICP analysis. The ICP measurement is carried out as described below.

First, powder containing the active material particles, solid electrolyte particles having first ion conductivity, conductive agent, binder, and the like is prepared in a manner as described earlier in connection with the SEM observation. Then, 0.05 g of this powder is put in a Teflon (registered trademark) container, and 8 mL of aqua regia is added to the powder. Then, the powder is evenly dissolved in the aqua regia under microwave heating. As a result, a liquid sample containing the respective components is prepared. Ultrapure water is added to the obtained solution to weigh 100 g in total, which is used as an ICP measurement sample. Under the following conditions, this ICP measurement sample is measured and analyzed with an ICP-emission spectrophotometer. Then, compositions of the active material particles and the solid electrolyte particles having first ion conductivity may be known from the obtained result.

(Measurement Conditions of ICP-Emission Spectroscopic Analyzer)

A cyclone chamber for a water solvent is used, and it is set such that a plasma gas (PL1): 13 (L/min), a sheath gas (Cl): 0.3 (L/min), a nebulizer gas pressure: 3.0 (bar), a nebulizer flow rate: 0.2 (L/min), and high frequency power: 1.0 (kw).

Quantitative values are calculated by comparing obtained results with analytical values of commercially-available standard solutions for atomic absorption analysis.

The solid electrolyte particles having first ion conductivity described herein refers to a solid electrolyte particles having a higher ionic conductance for first ion than for lithium ion. The first ion may be at least one selected from the group consisting of an alkali metal ion excluding lithium ion, a Ca ion, an Mg ion, and an Al ion. The alkali metal ion excluding lithium ion may be at least one selected from the group consisting of an Na ion, a K ion, a Rb ion, a Cs ion, and an Fr ion. Among these ions, the first ion may preferably be at least one selected from the group consisting of an Na ion and a K ion which are monovalent ions, because these ions may easily increase the ionic conductance for first ion of the solid electrolyte.

The solid electrolyte particles having first ion conductivity may include a first ion(s) and a lithium ion(s). In the solid electrolyte particle having first ion conductivity, the concentration of first ions is higher than the concentration of lithium ions. The first ion is not involved in electrode reactions in the lithium ion secondary battery. In the solid electrolyte particles having first ion conductivity, therefore, the first ions at a higher concentration than the lithium ions may allow more solvent molecules to be adsorbed to the solid electrolyte particles having first ion conductivity. This may provide excellent rate characteristics and low-temperature characteristics. The ICP analysis may determine whether the concentration of first ions is higher than the concentration of lithium ions in the solid electrolyte particles having first ion conductivity.

The ionic conductance for first ion at 25° C. of the solid electrolyte particles having first ion conductivity may be, for example, greater than or equal to $1 \times 10^{-10}$ S/cm, and preferably greater than or equal to $1 \times 10^{-6}$ S/cm. The solid electrolyte particles having first ion conductivity may preferably have a higher ionic conductance for first ion, because of a higher chance of ionic polarization on the particles surfaces and a greater number of adsorbable solvent molecules. The upper limit of the ionic conductance for first ion at 25° C. of the solid electrolyte particles having first ion conductivity may be, for example, $2 \times 10^{-2}$ S/cm. The ionic conductance for first ion at 25° C. of the solid electrolyte particles having first ion conductivity may preferably be between $1 \times 10^{-10}$ S/cm and $2 \times 10^{-2}$ S/cm.

The ionic conductance for first ion at 25° C. of the solid electrolyte particle having first ion conductivity can be measured as described below.

<Measurement of First Ionic Conductance of Solid Electrolyte Particles Having First Ion Conductivity>

First, 200 mg of a solid electrolyte particles, which is identical in composition to the solid electrolyte particles having first ion conductivity identified earlier by the ICP analysis, is compressed into a cylindrical-shaped compact having the diameter of 10 mm. This compact is heated at 1100° C. for five hours to obtain an inorganic compound in tablet form. Then, gold is deposited by sputtering on two surfaces of this tablet-shaped inorganic compound to measure an ionic conductance for first ion ($\sigma$). The ionic conductance is measured by an alternate current impedance method. A bulk resistance R($\Omega$) at room temperature is estimated from an arc obtained from the measurement. The thickness of the tablet-shaped inorganic compound is measured with a vernier caliper and expressed in L (cm), and a cross-sectional area is expressed in S (cm$^2$). Then, the ionic conductance for first ion, $\alpha$ (S/cm), is calculated by assigning the obtained values to the following formulas.

$$\rho = R \times S/L \quad \text{[Formula 1]}$$

$$\sigma = 1/\rho \quad \text{[Formula 2]}$$

The solid electrolyte particles having first ion conductivity may have an average primary particle size in the range of, for example, 0.1 µm to 20 µm, and preferably 0.1 µm to 5 µm. The average primary particle size in these numerical ranges may allow the solid electrolyte particles having first ion conductivity to fit in spaces between the active material particles. This may increase the number of solid electrolyte particles having first ion conductivity with no contact with the active material particles among all of the solid electrolyte particles having first ion conductivity included in the active material-containing layer. In other words, it is possible to reduce the area of the solid electrolyte particles having first ion conductivity to the total visual field area of the SEM image measured as described earlier. This may facilitate desolvation of the lithium ions during charge and discharge, offering superior rate characteristics and low-temperature characteristics.

The average primary particle size of the solid electrolyte particles having first ion conductivity may be measured through the SEM observation described earlier.

The solid electrolyte particles having first ion conductivity may be at least one selected from the group consisting of sulfide-based materials including 75 $Na_2S$—$P_2S_5$ (mol %), glass ceramics including $Na_2FeP_2O_7$, complex hydrides including $Na_2B_{10}H_{10}$, $Na_{1+x}Zr_2Si_xP_{3-x}O_{12}$ (0<x<3) with a NASICON-type skeleton, ion conducting materials including $\beta$-$Fe_2(SO_4)$, and $\beta$ alumina $Na_2O.11Al_2O_3$. The active material-containing layer included in the electrode may include only one type of solid electrolyte particles having first ion conductivity or may include two or more different types of solid electrolyte particles having first ion conductivity.

The solid electrolyte particles with a NASICON-type skeleton is not particularly limited insofar as the particles belongs to the NASICON-type crystal system and has first ion conductivity. Examples of the solid electrolyte particles with a NASICON-type skeleton include particles expressed by the general formula $A_aM_2(XO_4)_3$ (where "A" is one or more selected from alkali metals and alkali-earth metals, "M" is a transition metal, "X" is one or more selected from Si, P, S, As, Mo, and W, and "a" has a value in the range of 1 to 3) and forming a three-dimensional network, apexes of which are shared by $MO_6$ octahedrons and $XO_4$ tetrahedrons.

The NASICON-type solid electrolyte particles and $\beta$-$Fe_2$ $(SO_4)$-type solid electrolyte particles may be conductors for ions of alkali metals except sodium (excluding lithium ions).

The solid electrolyte particles having first ion conductivity may preferably be an oxide with a NASICON-type skeleton. Such an oxide may preferably be used in terms of easy synthesizability and stability in water content of air.

The solid electrolyte particles having first ion conductivity include, for example, at least one selected from the group consisting of $Na_3Zr_2Si_2PO_{12}$, $Na_2Zr_2SiP_2O_{12}$, $Na_{3.5}Zr_2Si_{2.5}P_{0.5}O_{12}$, $Na_{1.5}Zr_2Si_{0.5}P_{2.5}O_{12}$, $Na_2B_{10}H_{10}$, $Na_2O.11Al_2O_3$, $K_2Zr_2SiP_2O_{12}$, $CaZr_2SiP_2O_{12}$, $MgZr_2SiP_2O_{12}$, and $AlZr_2Si_2PO_{12}$. The solid electrolyte particles having first ion conductivity may be at least one selected from the group consisting of $Na_3Zr_2Si_2PO_{12}$, $Na_2Zr_2SiP_2O_{12}$, $Na_{3.5}Zr_2Si_{2.5}P_{0.5}O_{12}$, $Na_{1.5}Zr_2Si_{0.5}P_{2.5}O_{12}$, $Na_2B_{10}H_{10}$, $Na_2O.11Al_2O_3$, $K_2Zr_2SiP_2O_{12}$, $CaZr_2SiP_2O_{12}$, $MgZr_2SiP_2O_{12}$, and $AlZr_2Si_2PO_{12}$.

As described earlier, the electrode according to the embodiment includes the active material-containing layer including active material particles having lithium ion conductivity and solid electrolyte particles having first ion conductivity that are present away from the active material particles. The electrode may further include a current collector. The active material-containing layer may further include a conductive agent and a binder. The active material-containing layer may include only one type of solid electrolyte particles having first ion conductivity or may include two or more different types of solid electrolyte particles having first ion conductivity.

The electrode according to the embodiment may be for a lithium ion secondary battery.

The active material-containing layer may be a sheet-like layer that can be formed on one or both surfaces of the current collector. The active material-containing layer may have a thickness in the range of 20 µm to 80 µm.

The weight ratio of solid electrolyte particles having first ion conductivity to the weight of the active material-containing layer in the electrode may be, for example, in the range of 0.1 wt. % to 30 wt. %, preferably in the range of 0.5 wt. % to 20 wt. %, and more preferably in the range of 1 wt. % to 10 wt. %. The solid electrolyte particles having first ion conductivity within the range of weight ratios achieve excellent rate characteristics and low-temperature characteristics and also allow a high capacity to be maintained.

Next, respective cases where the electrode according to the embodiment is a positive electrode and a negative electrode are described below in detail. The description starts with the negative electrode.

The negative electrode includes a negative electrode current collector and a negative electrode active material-containing layer supported on one or both surfaces of the negative electrode current collector. The negative electrode active material-containing layer includes a negative electrode active material particles having lithium ion conductivity and a solid electrolyte particles having first ion conductivity. The solid electrolyte particles are present away from the negative electrode active material particles in the layer. The negative electrode active material-containing layer may further include a conductive agent and a binder. The negative electrode active material-containing layer may include only one type of solid electrolyte particles having first ion conductivity or may include two or more different types of solid electrolyte particles having first ion conductivity.

The negative electrode current collector may be made of a material electrochemically stable at potentials for lithium insertion and extraction in the negative electrode active material. The negative electrode current collector may preferably be made of an aluminum alloy containing copper, nickel, stainless steel, or aluminum, or one or more selected from Mg, Ti, Zn, Mn, Fe, Cu, and Si. The negative electrode current collector may preferably have a thickness in the range of 5 μm to 20 μm. The negative electrode current collector having such a thickness may allow the negative electrode to achieve both strength and weight reduction in a well-balanced manner.

The negative electrode current collector may include, on its surface, a part where the negative electrode active material-containing layer is not formed. This part may serve as a negative electrode tab.

As the negative electrode active material, those capable of allowing lithium ions to be inserted thereinto and extracted therefrom can be used, and examples thereof can include a carbon material, a graphite material, a lithium alloy material, a metal oxide, and a metal sulfide. The negative electrode active material preferably contains a titanium oxide whose insertion and extraction potential of lithium ion is within a range of 1 V to 3 V (vs. Li/Li$^+$).

Examples of the titanium oxide include lithium titanate (for example, $Li_{2+y}Ti_3O_7$, $0 \le y \le 3$) having a ramsdellite structure, lithium titanate (for example, $Li_{4+x}Ti_5O_{12}$, $0 \le x \le 3$) having a spinel structure, monoclinic titanium dioxide ($TiO_2$), anatase titanium dioxide, rutile titanium dioxide, a hollandite titanium composite oxide, an orthorhombic titanium-containing composite oxide, and a monoclinic niobium titanium composite oxide.

An example of the orthorhombic titanium-containing composite oxide is a compound represented by $Li_{2+a}M(I)_{2-b}Ti_{6-c}M(II)_dO_{14}+\sigma$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni, and Al. Each subscript in the composition formulas is given such that $0 \le a \le 6$, $0 \le b < 2$, $0 \le c < 6$, $0 \le d < 6$, and $-0.5 \le \sigma \le 0.5$. A specific example of the orthorhombic titanium-containing composite oxide is $Li_{2+a}Na_2Ti_6O_{14}$ ($0 \le a \le 6$).

An example of the monoclinic niobium titanium composite oxide is a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. Each subscript in the composition formulas is given such that $0 \le x \le 5$, $0 \le y < 1$, $0 \le z < 2$, and $-0.3 \le \delta \le 0.3$. A specific example of the monoclinic niobium titanium composite oxide is $Li_xNb_2TiO_7$ ($0 \le x \le 5$).

Another example of the monoclinic niobium titanium composite oxide is a compound represented by $Ti_{1-y}M3_{y+z}Nb_{2-z}O_{7-\delta}$. Here, M3 is at least one selected from the group consisting of Mg, Fe, Ni, Co, W, Ta, and Mo. Each subscript in the composition formulas is given such that $0 \le y < 1$, $0 \le z \le 2$, and $-0.3 \le \delta \le 0.3$.

The negative electrode active material particles may be primary particles, secondary particles which is an aggregate of the primary particles, or a mixture of primary particles and secondary particles. In view of higher density, the negative electrode active material-containing layer may preferably include 5 to 50 vol. % of primary particles. Examples of the shape of the primary particle may include but are not limited to spherical, elliptical, flat, and fiber-like shapes.

The negative electrode active material particles may preferably have an average primary particle size in the range of 0.1 μm to 1 μm, and their specific surface area according to the BET method using $N_2$ adsorption may preferably be in the range of 3 m$^2$/g to 200 m$^2$/g. This may enhance affinity with nonaqueous electrolyte. The negative electrode active material particles may more preferably have an average primary particle size in the range of 0.5 μm to 1 μm.

A Brunauer, Emmett, and Teller (BET) specific surface area of the negative electrode active material is preferably within a range of 3 m$^2$/g to 200 m$^2$/g. Within this range, it is possible to suppress the coverage rate of the ferroelectric particles on the active material particles surfaces from being excessively increased. Within this range, it is possible to enhance affinity with the electrolyte, and thus, the input/output characteristics are enhanced.

The solid electrolyte particle having first ion conductivity may be selected from the examples described earlier.

A conductive agent is added in order to increase the current-collecting performance and suppress the contact resistance between the active material and the current collector. Examples of the conductive agent include carbonaceous materials such as vapor grown carbon fiber (VGCF) and carbon black. Examples of the carbon black include acetylene black and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added in order to fill a gap between dispersed active materials and bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

The negative electrode may preferably have a porosity (excluding the current collector) ranging from 20% to 50%. Such porosity may provide a negative electrode that excels in affinity with electrolyte and attains a higher density. A more preferable range of the porosity may be 25% to 40%.

The contents of the negative electrode active material particles, solid electrolyte particles having first ion conductivity, conductive agent, and binder included in the negative electrode active material-containing layer may preferably be in the ranges of, respectively, 70 mass % to 95 mass %, 0.05 mass % to 30 mass %, 2 mass % to 18 mass %, and 2 mass % to 10 mass %.

The negative electrode may be produced in the following process. First, the negative electrode active material, solid electrolyte particles having first ion conductivity, conductive agent, and binder are suspended in a solvent to prepare a slurry. This slurry is applied to one or both surfaces of the negative electrode current collector. Next, the applied slurry is dried to obtain a laminate including the negative electrode active material-containing layer and the negative electrode current collector. The obtained laminate is subjected to pressing. The negative electrode is thus produced.

The negative electrode may be produced otherwise, for example, in the following process. First, the negative electrode active material, solid electrolyte particles having first ion conductivity, conductive agent, and binder are blended into a mixture. This mixture is molded into pellets. The obtained pellets are stacked on the negative electrode current collector. As a result, the negative electrode is obtained.

Next, a case where the electrode according to the embodiment is a positive electrode will be described.

The positive electrode includes a positive electrode current collector and a positive electrode active material-containing layer supported on one or both surfaces of the positive electrode current collector. The positive electrode active material-containing layer includes positive electrode active material particles having lithium ion conductivity and solid electrolyte particles having first ion conductivity. The solid electrolyte particles are present away from the positive electrode active material particles in the layer. The positive electrode active material-containing layer may further include a conductive agent and a binder. The positive electrode active material-containing layer may include only one type of solid electrolyte particles having first ion conductivity or may include two or more different types of solid electrolyte particles having first ion conductivity.

The positive electrode current collector is preferably an aluminum foil or an aluminum alloy foil containing one or more elements selected from Mg, Ti, Zn, Ni, Cr, Mn, Fe, Cu, and Si.

A thickness of the aluminum foil or the aluminum alloy foil is preferably from 5 μm to 20 μm, and more preferably from 5 μm to 15 μm. A purity of the aluminum foil is preferably 99% by mass or more. A content of transition metals such as iron, copper, nickel, and chromium contained in the aluminum foil or the aluminum alloy foil is preferably 1% by mass or less.

In addition, the positive electrode current collector may have a part on the surface of which the positive electrode active material-containing layer is not formed. This part can function as a positive electrode tab.

Examples of the positive electrode active material include oxides and sulfides having lithium ion conductivity. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 $m^2$/g to 10 $m^2$/g. The positive electrode active material having a specific surface area of 0.1 $m^2$/g or more may secure an adequately large site for insertion and extraction of Li ions. The positive electrode active material having a specific surface area of 10 $m^2$/g or less may be easy to handle in industrial applications and may ensure a favorable charge-and-discharge cycle.

The solid electrolyte particle having first ion conductivity may be selected from the examples described earlier.

A binder is added in order to fill a gap between dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compound, imide compound, carboxyl methyl cellulose (CMC), and salts of the CMC. One of these materials may be used as the binder, or two or more of these materials may be combined and used as the binder.

A conductive agent is added in order to increase the current-collecting performance and to suppress the contact resistance between the positive electrode active material and the positive electrode current collector. Examples of the conductive agent include carbonaceous materials such as vapor grown carbon fiber (VGCF), carbon black and graphite. An example of the carbon black include acetylene black. One of these materials may be used as the conductive agent, or two or more of these materials may be combined and used as the conductive agent. In addition, the conductive agent can be omitted.

The contents of the positive electrode active material particles, solid electrolyte particles having first ion conductivity, conductive agent, and binder included in the positive electrode active material-containing layer may preferably be in the ranges of, respectively, 70 mass % to 95 mass %, 0.05 mass % to 30 mass %, 2 mass % to 18 mass %, and 2 mass % to 10 mass %.

The positive electrode may be produced in the following process. First, the positive electrode active material, solid electrolyte particles having first ion conductivity, conductive agent, and binder are suspended in a solvent to prepare a slurry. This slurry is applied to one or both surfaces of the positive electrode current collector. Next, the applied slurry is dried to obtain a laminate including the positive electrode active material-containing layer and the positive electrode current collector. The obtained laminate is subjected to pressing. The positive electrode is thus produced.

The positive electrode may be produced otherwise, for example, in the following process. First, the positive electrode active material, solid electrolyte particles having first ion conductivity, conductive agent, and binder are blended into a mixture. This mixture is molded into pellets. The obtained pellets are stacked on the positive electrode current collector. As a result, the positive electrode is obtained.

According to the first embodiment, an electrode is provided. The electrode includes an active material-containing layer including active material particles and solid electrolyte particles being present away from the active material particles. The active material particles have lithium ion conductivity. The solid electrolyte particles have first ion conductivity. The solid electrolyte particles include the first ion that is at least one selected from the group consisting of an alkali metal ion excluding a lithium ion, a Ca ion, an Mg ion, and an Al ion. The electrode successfully provide a lithium ion secondary battery that excels in rate characteristics and low-temperature characteristics.

Second Embodiment

According to the second embodiment, a laminate is provided. The laminate includes an electrode having an active material-containing layer and a solid electrolyte layer. The active material-containing layer includes active material particles having lithium ion conductivity. The solid electrolyte layer includes solid electrolyte particles having first ion conductivity that are present away from the active material particles. The first ion may be at least one selected from the group consisting of an alkali metal ion excluding lithium ion, a Ca ion, an Mg ion, and an Al ion.

While the first embodiment described the electrode including the solid electrolyte particles having first ion conductivity, it may be unnecessary for the electrode to include the solid electrolyte particles having first ion conductivity insofar as the solid electrolyte particles having first ion conductivity are present away from the active material particles.

Specifically, the laminate characterized as described below may provide a lithium ion secondary battery that excels in rate characteristics and low-temperature characteristics. That is, the laminate according to the embodiment includes an electrode having an active material-containing layer and a solid electrolyte layer. The active material-containing layer includes active material particles having lithium ion conductivity. The solid electrolyte layer includes solid electrolyte particles having first ion conductivity that are present away from the active material particles. The first ion is at least one selected from the group consisting of an alkali metal ion excluding lithium ion, a Ca ion, an Mg ion, and an Al ion.

The laminate according to the embodiment may have a layered structure constructed of an electrode including an active material-containing layer and a solid electrolyte layer. The electrode and the solid electrolyte layer may have, for example, a sheet-like shape. The electrode may further include a current collector. One of main surfaces of the active material-containing layer may be in contact with the current collector of the electrode. The other main surface of the active material-containing layer may be in contact with the solid electrode-containing layer.

The electrode may be either one of the negative electrode or the positive electrode described in the first embodiment. In the laminate according to the second embodiment, the solid electrolyte layer includes the solid electrolyte particles having first ion conductivity. Hence, it may be unnecessary for the electrode to include the solid electrolyte particles having first ion conductivity. In case the solid electrolyte particles having first ion conductivity are not included in the electrode, the laminate has the solid electrolyte layer including the solid electrolyte particles having first ion conductivity that are present away from the active material particles. The laminate according to the embodiment, therefore, may provide a lithium ion secondary battery that excels in rate characteristics and low-temperature characteristics.

The active material-containing layer in the electrode included in the laminate according to the second embodiment may include the solid electrolyte particles having first ion conductivity. In the laminate according to the embodiment, when the electrode and the solid electrolyte layer both include the solid electrolyte particles having first ion conductivity, the lithium ions are more even smoothly desolvated during charge and discharge. Therefore, excellent rate characteristics and low-temperature characteristics are achieved.

The laminate may have a separator in addition to the electrode and the solid electrolyte layer. The separator may be interposed between the electrode and the solid electrolyte layer.

The separator may include a porous film made of polyethylene (PE), polypropylene (PP), cellulose, or polyvinylidene fluoride (PVdF), or include an unwoven fabric made of a synthetic resin. Preferably, a porous film made of polyethylene or polypropylene may be used in terms of safety. The porous film made of such a material may dissolve at a certain temperature and block electric current.

The separator may have a thickness between 5 μm and 30 μm.

If necessary, the solid electrolyte layer may include a binder, an organic electrolyte, and solid electrolyte particles having lithium ion conductivity.

The solid electrolyte layer may have a thickness from 1 μm to 20 μm, and preferably from 2 μm to 10 μm. The thickness of the solid electrolyte layer in these numerical ranges may allow lithium ions to adequately diffuse in the solid electrolyte layer without an unnecessarily increased diffusion length. The supply of lithium ions, therefore, may be facilitated at the time of fast charge and discharge.

The solid electrolyte particles having first ion conductivity may be selected from the examples described earlier.

The binder may be a high polymer capable of gelating with an organic solvent such as carbonates. Examples of the binder may include polyacrylonitrile (PAN), polyethylene oxide (PEO), polyvinylidene fluoride (PVdF), and polymethyl methacrylate. The binder may be one selected from these examples, or two or more of the exemplified materials may be combined and used.

The weight ratio of the binder to the weight of the solid electrolyte layer may be from 0.1 wt. % to 10 wt. %, and preferably from 0.5 wt. % to 5 wt. %. An inadequately low weight ratio of the binder to the weight of the solid electrolyte layer may lead to an insufficient viscosity of the gelated organic electrolyte. As a result, the solid electrolyte particles may no longer be retainable, which may involve the risk of a poor mechanical strength of the solid electrolyte layer or detachment of the solid electrolyte layer from the electrode.

The organic electrolyte includes an organic solvent and an electrolyte salt. The organic electrolyte may include at least an organic solvent exhibiting lithium ion conductivity that is at least one selected from propylene carbonate, ethylene carbonate, diethyl carbonate, and methyl ethyl carbonate. By using any one(s) of these organic solvents, the solid electrolyte particles having first ion conductivity may be difficult to dissolve and may accordingly present with stability.

The electrolyte salt may preferably include lithium salt selected from, for example, lithium perchlorate ($LiClO_4$), lithium hexafluorophosphate ($LiPF_5$), lithium tetrafluoroborate (LiBF), lithium hexafluorophosphate ($LiAsF_6$), lithium trifluoromethanesulfonate ($LiCF_3SO_3$), and lithium bis (trifluoromethylsulfonyl) imide ($[LiN(CF_3SO_2)_2]$), or may include a mixture of these exemplified materials. The organic electrolyte may include any electrolyte salt but the mentioned examples.

The weight ratio of the organic electrolyte to the weight of the solid electrolyte layer may be from 0.1 mass % to 20 mass %, and preferably from 1 mass % to 10 mass %.

An example of the laminate is hereinafter described referring to FIGS. 3 and 4.

FIG. 3 is a schematic drawing in cross section of an example of the laminate. A laminate 20 illustrated in FIG. 3 includes a negative electrode 3 and a solid electrolyte layer 18. The negative electrode 3 includes a negative electrode current collector 3a, and a negative electrode active material-containing layer 3b formed on the negative electrode current collector 3a. One of main surfaces of the negative electrode active material-containing layer 3b is in contact with the negative electrode current collector 3a, and the other main surface of the negative electrode active material-containing layer 3b is in contact with the solid electrolyte layer 18. The solid electrolyte layer 18 includes solid electrolyte particles having first ion conductivity that are present away from active material particles included in the negative electrode active material-containing layer.

FIG. 4 is a schematic drawing in cross section of another example of the laminate. A laminate 20 illustrated in FIG. 4 is structurally similar to the laminate of FIG. 3, except that a separator 4 is interposed between the negative electrode active material-containing layer 3b and the solid electrolyte layer 18. As in the illustrated example, desolvation of lithium ions may be accelerated during charge and discharge in the vicinity of negative electrode active material particles without direct contact between the negative electrode active material-containing layer 3b and the solid electrolyte layer 18. This may offer superior rate characteristics and low-temperature characteristics.

The laminate may be an electrode group including one of the positive electrode and the negative electrode, solid electrolyte layer, and the other one of the positive and negative electrodes that is arranged in this order. The solid electrolyte layer may be disposed in the laminate to avoid any contact between the positive electrode and the negative electrode.

The laminate may be an electrode group including a sheet-like positive electrode, sheet-like solid electrolyte layer, and sheet-like negative electrode that are stacked on one another in this order. In this laminate, one of main surfaces of the positive electrode active material-containing layer included in the positive electrode is in contact with one of main surfaces of the solid electrolyte layer, and one of main surfaces of the negative electrode active material-containing layer included in the negative electrode is in contact with the other main surface of the solid electrolyte layer. At least one of the positive electrode active material-containing layer and the negative electrode active material-containing layer may have no contact with the solid electrolyte layer. In the case of no contact between the solid electrolyte layer and at least one of the positive electrode active material-containing layer and the negative electrode active material-containing layer, a separator may be interposed between the solid electrolyte layer and the positive/negative electrode active material-containing layer. For example, the separator may be interposed between the solid electrolyte layer and the positive electrode active material-containing layer. Alternatively, the separator may be interposed between the solid electrolyte layer and the negative electrode active material-containing layer. The separator may be interposed between the solid electrolyte layer and the positive electrode active material-containing layer and between the solid electrolyte layer and the negative electrode active material-containing layer.

According to a second embodiment, a laminate is provided. The laminate includes a solid electrolyte layer and an electrode including an active material-containing layer. The active material-containing layer includes active material particles having lithium ion conductivity. The solid electrolyte layer includes solid electrolyte particles having first ion conductivity that are present away from the active material particles. The first ion may be at least one selected from the group consisting of an alkali metal ion excluding lithium ion, a Ca ion, an Mg ion, and an Al ion. This laminate may successfully provide a lithium ion secondary battery that excels in rate characteristics and low-temperature characteristics.

Third Embodiment

According to the third embodiment, a lithium ion secondary battery is provided. The lithium ion secondary battery includes a nonaqueous electrolyte and the electrode according to the first embodiment. The lithium ion secondary battery may instead include a nonaqueous electrolyte and the laminate according to the second embodiment. The lithium ion secondary battery may include, for example, a positive electrode, a negative electrode, and a nonaqueous electrolyte. At least one of the positive electrode and the negative electrode may be the electrode described in the first embodiment.

The lithium ion secondary battery may further include a solid electrolyte layer and a separator. When the electrode according to the first embodiment is used as at least one of the positive electrode and the negative electrode, the lithium ion secondary battery may include a separator without the solid electrolyte layer.

The nonaqueous electrolyte may be retainable in an electrode, a laminate, or an electrode group. The lithium ion secondary battery may further include a container member in which the electrode group and the nonaqueous electrolyte are containable. The lithium ion secondary battery may further include a negative electrode terminal electrically connected to the negative electrode and a positive electrode terminal electrically connected to the positive electrode.

Hereinafter, a detailed description is given to the negative electrode, positive electrode, nonaqueous electrolyte, solid electrolyte layer, separator, container member, negative electrode terminal, and positive electrode terminal.

(1) Negative Electrode

The negative electrode provided in the lithium ion secondary battery according to the third embodiment may be the negative electrode described in the first embodiment. When the positive electrode used is configured as described in the first embodiment, it may be unnecessary for the negative electrode to include the solid electrolyte particles having first ion conductivity.

(2) Positive Electrode

The positive electrode provided in the lithium ion secondary battery according to the third embodiment may be the positive described in the first embodiment. When the negative electrode used is configured as described in the first embodiment, it may be unnecessary for the positive electrode to include the solid electrolyte particles having first ion conductivity.

(3) Nonaqueous Electrolyte

Examples of the nonaqueous electrolyte may include liquid nonaqueous electrolyte or gel nonaqueous electrolyte having lithium ion conductivity. The liquid nonaqueous electrolyte may be prepared by dissolving an electrolyte salt used as solute in an organic solvent.

The electrolyte salt may preferably have a concentration in the range of 0.5 mol/L to 2.5 mol/L, and preferably in the range of 0.8 mol/L to 1.5 mol/L. When the electrolyte salt concentration falls within these numerical ranges, the electrolyte solution may have a high ionic conductance. As a result, superior rate characteristics and low-temperature characteristics may be achieved.

Examples of the electrolyte salt include lithium salts such as lithium perchlorate ($LiClO_4$), lithium hexafluorophosphate (LiPF), lithium tetrafluoroborate ($LiBF_4$), lithium hexafluoroarsenate (LiAsFs), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The organic solvent included in the nonaqueous electrolyte may preferably have a viscosity as low as possible. The organic solvent low in viscosity may allow the solvent molecules to more easily adsorb to the solid electrolyte particles having first ion conductivity. This may promise improved rate characteristics and low-temperature characteristics. For example, as compared with the organic solvent including DEC, the organic solvent including MEC or DMC may lower the viscosity of the nonaqueous electrolyte. This may promise further improved rate characteristics and low-temperature characteristics.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

The nonaqueous electrolyte may be a normal-temperature molten salt (ionic melt) containing lithium ions, instead of the liquid or gel nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

(4) Solid Electrolyte Layer

The solid electrolyte layer included in the lithium ion secondary battery according to the third embodiment may be the solid electrolyte layer included in the laminate according to the second embodiment. When at least one of the positive and negative electrodes includes solid electrolyte particles having first ion conductivity that are present away from the active material particles, the lithium ion secondary battery may include a separator instead of the solid electrolyte layer.

(5) Separator

The separator provided in the lithium ion secondary battery according to the third embodiment may be the separator described in the second embodiment.

(6) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by weight or less.

The shape of the container member is not particularly limited. The shape of the container member may be, for example, flat (thin), square, cylinder, coin, or button-shaped. The container member may be appropriately selected depending on battery size and use of the battery.

(7) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(8) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

Figure 5:
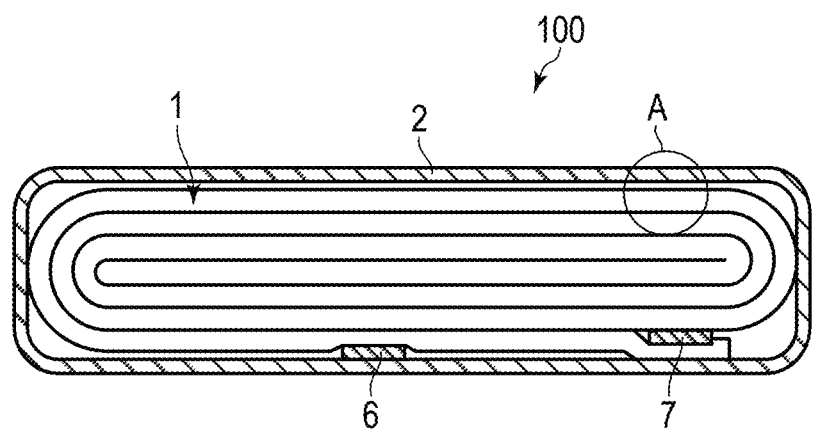
FIG. 5 is a schematic view in cross section that illustrates an example of a lithium ion secondary battery according to a third embodiment.
Figure 6:
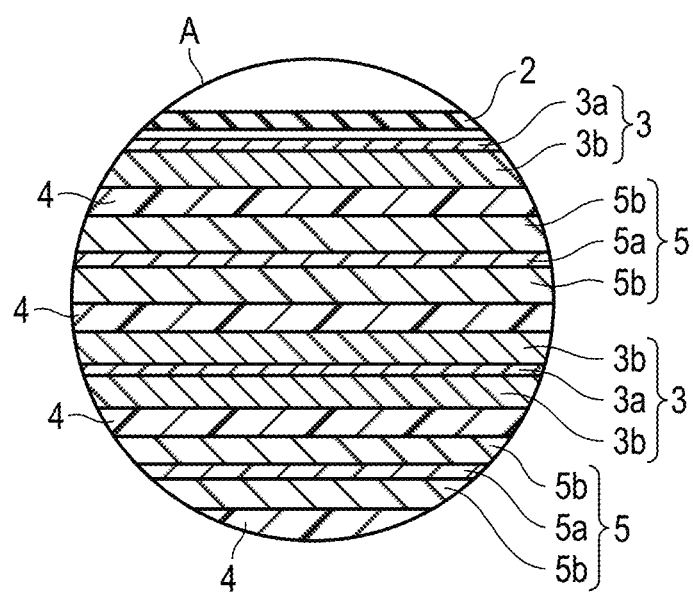
FIG. 6 is an enlarged view in cross section of a part A in the lithium ion secondary battery illustrated in FIG. 5.

FIG. 5 is a sectional view schematically showing an example of a secondary battery according to an embodiment. FIG. 6 is an enlarged sectional view of a portion A of the secondary battery shown in FIG. 5.

The secondary battery 100 shown in FIG. 5 and FIG. 6 includes a bag-shaped container member 2 shown in FIG. 5, an electrode group 1 shown in FIG. 5 and FIG. 6, and a nonaqueous electrolyte (not shown). The electrode group 1 and the nonaqueous electrolyte are stored in the bag-shaped container member 2. The nonaqueous electrolyte (not shown) is held in the electrode group 1.

The bag-shaped container member 2 is formed from a laminate film including two resin layers and a metal layer disposed therebetween.

As shown in FIG. 5, the electrode group 1 is a flat wound electrode group. The flat wound electrode group 1 includes negative electrodes 3, separators 4, and positive electrodes 5 as shown in FIG. 6. The separator 4 is disposed between the negative electrode 3 and the positive electrode 5. The secondary battery may include a solid electrolyte layer instead of the separator 4.

The negative electrode 3 includes a negative electrode current collector 3a and negative electrode active material-containing layers 3b. In the portion of the negative electrode 3 located at the outermost shell of the wound electrode group 1, the negative electrode active material-containing layer 3b is formed only on the inside surface side of the negative electrode current collector 3a, as shown in FIG. 6. In another portion of the negative electrode 3, the negative electrode active material-containing layer 3b is formed on both sides of the negative electrode current collector 3a.

The positive electrode 5 includes a positive electrode current collector 5a and positive electrode active material-containing layers 5b formed on both sides thereof.

As shown in FIG. 5, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the openings are closed by thermal fusion bonding of the thermoplastic resin layer.

Figure 7:
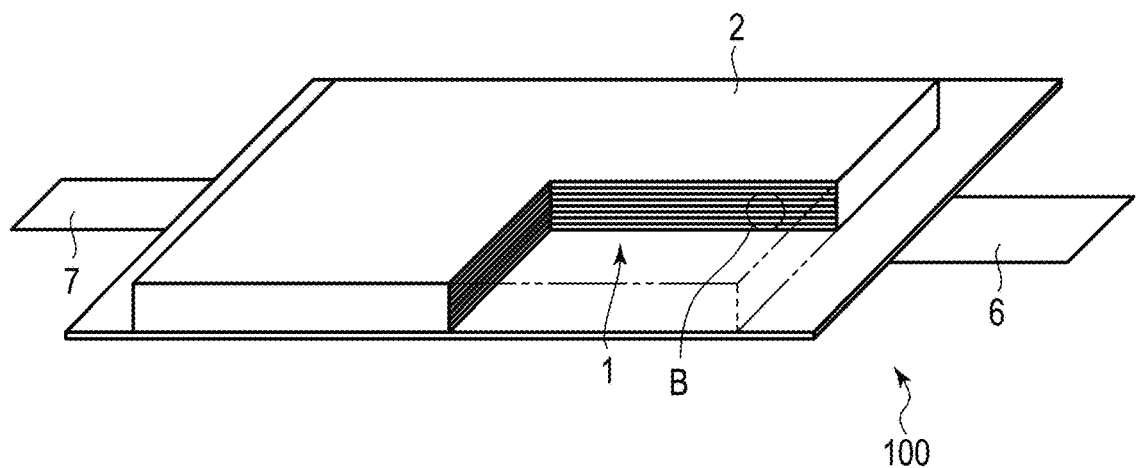
FIG. 7 is a partially cut-away sectional perspective view schematically illustrating another example of another lithium ion secondary battery according to the third embodiment.
Figure 8:
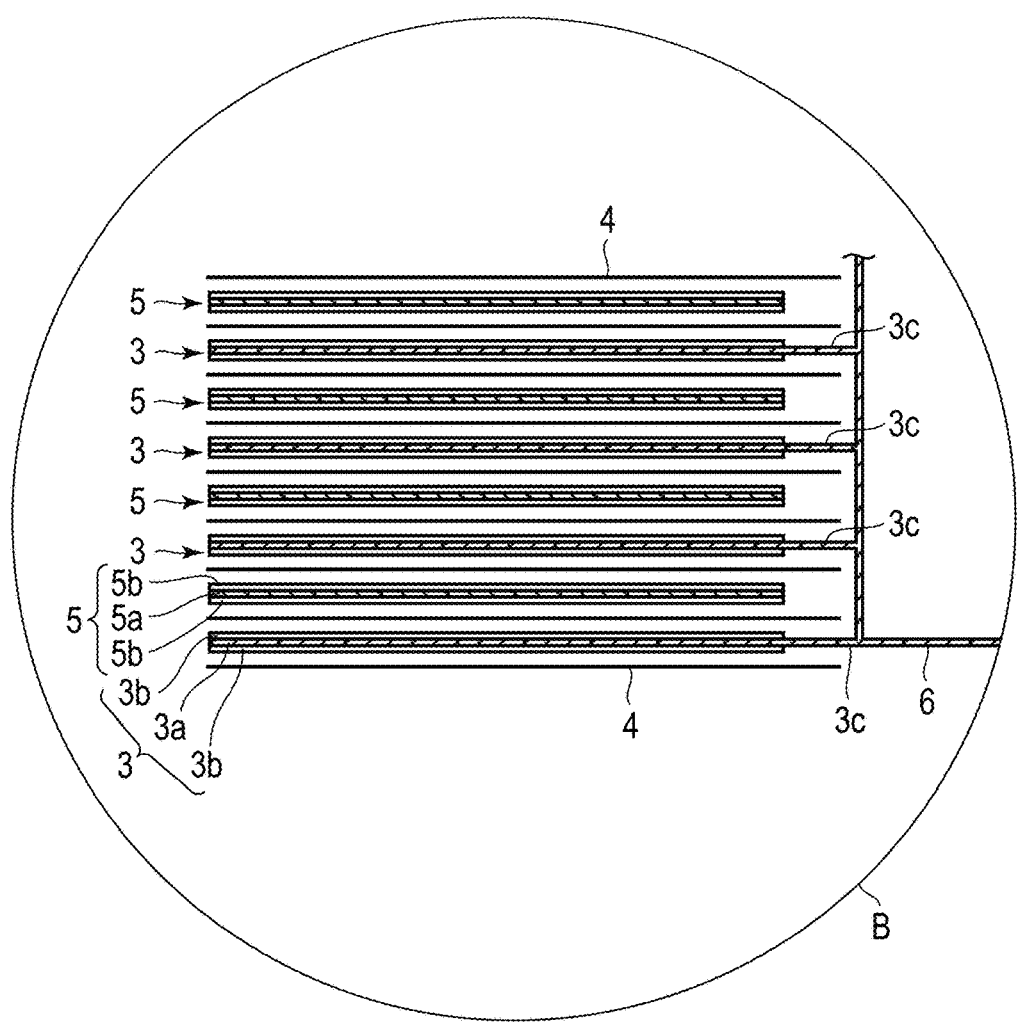
FIG. 8 is an enlarged view in cross section of a part B in the lithium ion secondary battery illustrated in FIG. 7.

The secondary battery according to the embodiment is not limited to the secondary battery having the structure shown in FIGS. 5 and 6, and may be, for example, a battery having a structure shown in FIGS. 7 and 8.

FIG. 7 is a partial cut-away sectional perspective view schematically showing another example of the secondary battery according to the second embodiment. FIG. 8 is an enlarged sectional view of a portion B of the secondary battery shown in FIG. 7.

The secondary battery 100 shown in FIGS. 7 and 8 includes an electrode group 1 shown in FIGS. 7 and 8, a container member 2 shown in FIG. 7, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 8, the electrode group 1 is a laminated electrode group. The laminated electrode group 1 has a structure in which a negative electrode 3 and a positive electrode 5 are alternately laminated with a separator 4 intervening therebetween.

The electrode group 1 includes plural of negative electrodes 3. Each of the negative electrodes 3 includes a negative electrode current collector 3a and a negative electrode active material-containing layer 3b carried on both surfaces of the negative electrode current collector 3a. In addition, the electrode group 1 includes plural of positive electrodes 5. Each of the positive electrodes 5 includes a positive electrode current collector 5a and a positive electrode active material-containing layer 5b carried on both surfaces of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode current collector tab. As shown in FIG. 8, the portion 3c acting as the negative electrode current collector tab does not overlap the positive electrode 5. In addition, plural of negative electrode current collector tabs (portion 3c) are electrically connected to the belt-shaped negative electrode terminal 6. A tip of the belt-shaped negative electrode terminal 6 is drawn outward from the container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to the belt-shaped positive electrode terminal 7. A tip of the belt-shaped positive electrode terminal 7 is positioned on the opposite side to the negative electrode terminal 6 and is drawn outward from the container member 2.

The lithium ion secondary battery according to the embodiment may constitute a battery module. The battery module may include plural of lithium ion secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

FIG. 9 is a perspective view schematically showing an example of the battery module according to the embodiment. The battery module 200 shown in FIG. 9 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 9 is a battery module of five in-series connection.

As shown in FIG. 9, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

The lithium ion secondary battery according to the third embodiment includes a nonaqueous electrolyte and the electrode according to the first embodiment. The lithium ion secondary battery according to the third embodiment may instead include a nonaqueous electrolyte and the laminate according to the second embodiment. The lithium ion secondary battery according to the embodiment, therefore, excels in rate characteristics and low-temperature characteristics.

Fourth Embodiment

According to the fourth embodiment, a battery pack is provided. The battery pack includes the lithium ion secondary battery according to the third embodiment. The battery pack includes one lithium ion secondary battery according to the third embodiment, or may include a battery module with plural of lithium ion secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 10:
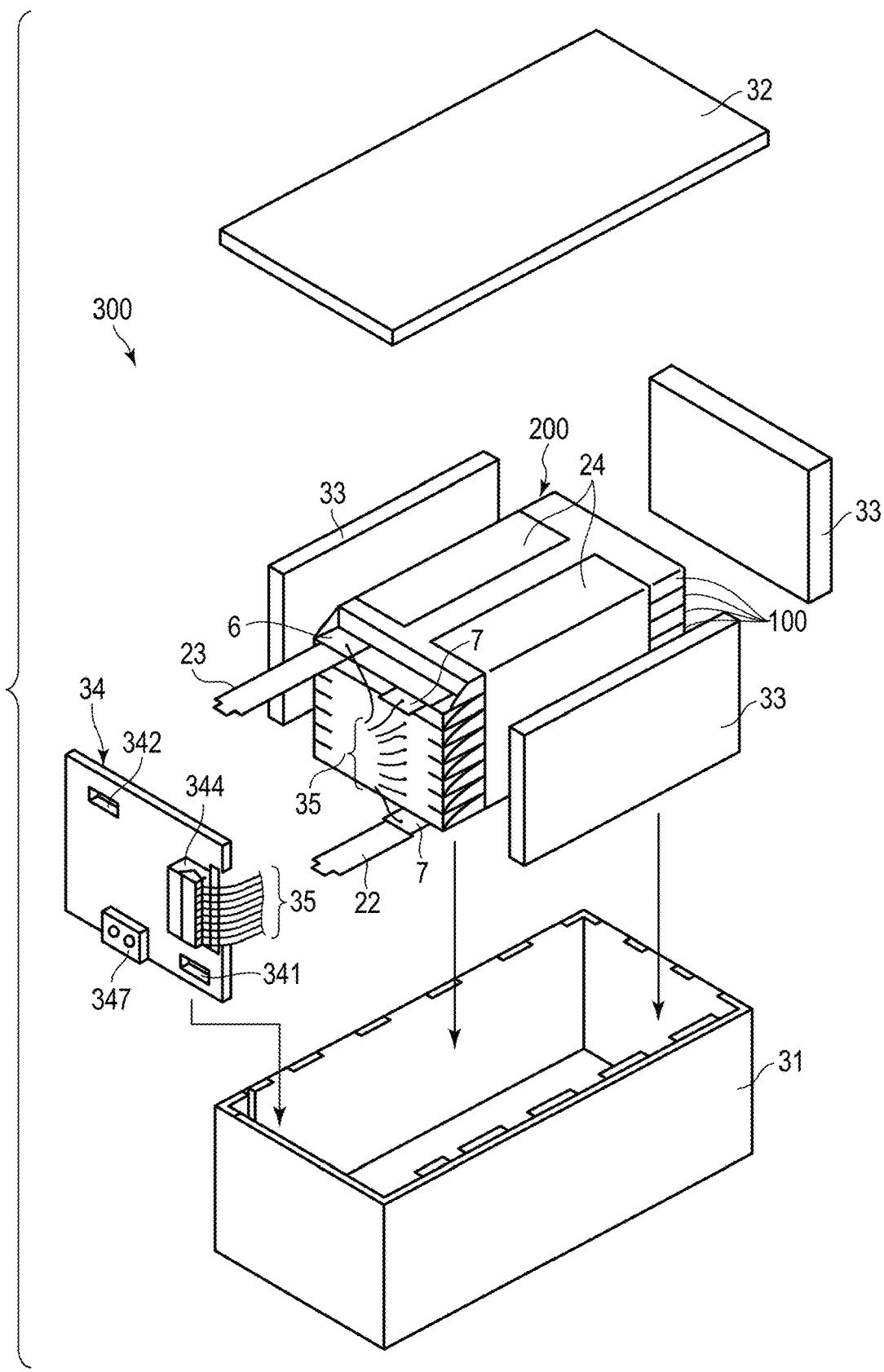
FIG. 10 is a schematic perspective view that illustrates an example of a battery pack according to a fourth embodiment.

FIG. 10 is an exploded perspective view schematically showing an example of the battery pack according to the embodiment. FIG. 11 is a block diagram showing an example of an electric circuit of the battery pack shown in FIG. 10.

A battery pack 300 shown in FIGS. 10 and 11 includes a housing container 31, a lid 32, protective sheets 33, a battery module 200, a printed wiring board 34, wires 35, and an insulating plate (not shown).

A housing container 31 shown in FIG. 10 is a bottomed-square-shaped container having a rectangular bottom surface. The housing container 31 is configured to house protective sheet 33, a battery module 200, a printed wiring board 34, and wires 35. A lid 32 has a rectangular shape.

The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

The unit cell 100 has, for example, a structure shown in FIGS. 5 and 6. At least one of the plural unit cells 100 is a secondary battery according to the third embodiment. The plural unit cells 100 are stacked such that the negative electrode terminals 6 and the positive electrode terminals 7, which extend outside, are directed toward the same direction. The plural unit cells 100 are electrically connected in series, as shown in FIG. 10. The plural unit cells 100 may alternatively be electrically connected in parallel, or connected in a combination of in-series connection and in-parallel connection. If the plural unit cells 100 are connected in parallel, the battery capacity increases as compared to a case in which they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One end of the positive electrode-side lead 22 is connected to the positive electrode terminal 7 of the unit cell 100 located lowermost in the stack of the unit cells 100. One end of the negative electrode-side lead 23 is connected to the negative electrode terminal 6 of the unit cell 100 located uppermost in the stack of the unit cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each unit cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural unit cells 100. The protective circuit 344 is also configured to cut-off electric connection between the protective circuit 344 and the external power distribution terminal 347, based on detection signals transmitted from the thermistor 343 or detection signals transmitted from each unit cell 100 or the battery module 200.

An example of the detection signal transmitted from the thermistor 343 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the lithium ion secondary battery according to the third embodiment. The battery pack, therefore, excels in rate characteristics and low-temperature characteristics.

Fifth Embodiment

According to the fifth embodiment, a vehicle is provided. The vehicle includes the battery pack according to the fourth embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

FIG. 12 is a sectional view schematically showing an example of a vehicle according to the embodiment.

The vehicle 400 shown in FIG. 12 includes a vehicle body 40 and a battery pack 300 according to the fourth embodiment. The vehicle 400 shown in FIG. 12 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 12, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Figure 13:
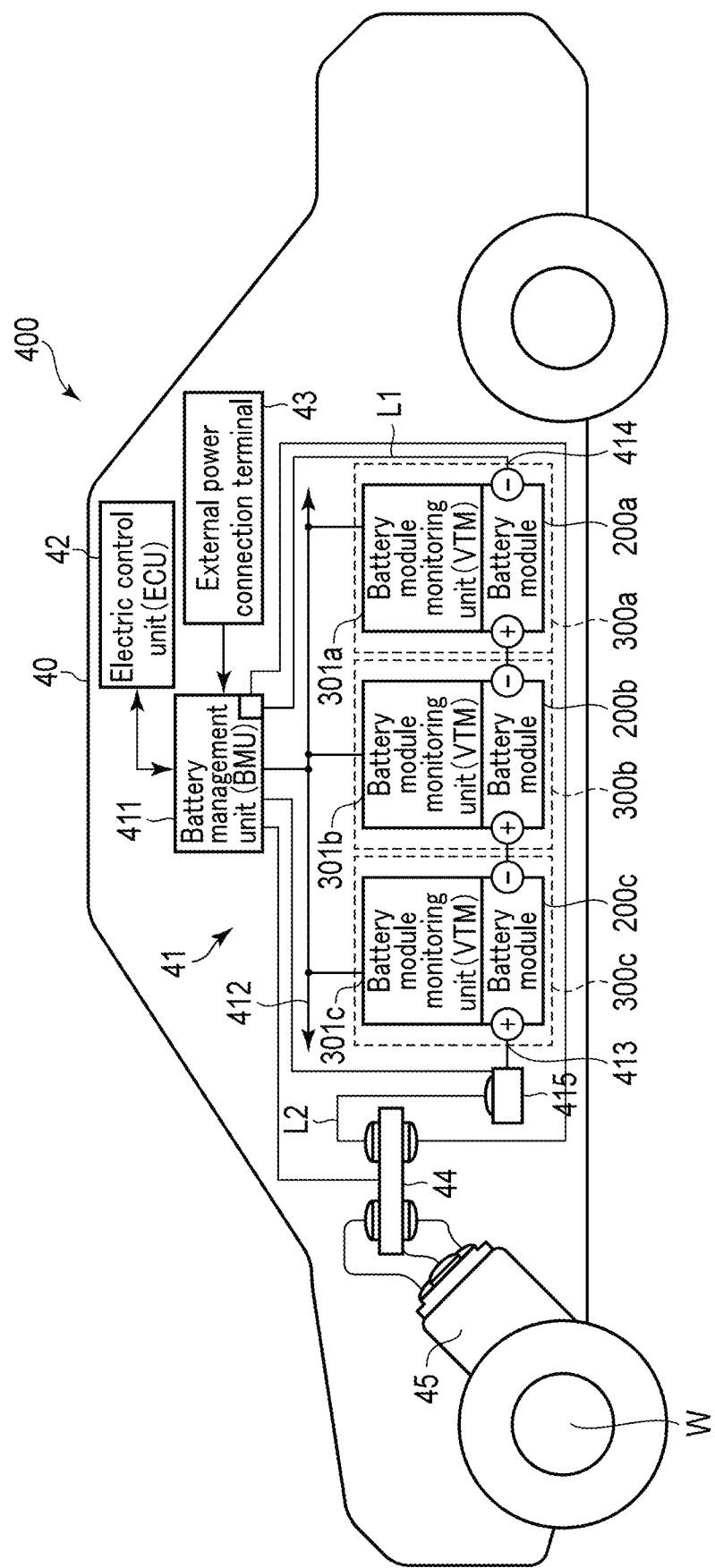
FIG. 13 is a schematic view that illustrates an example of another vehicle according to the fifth embodiment.

Next, with reference to FIG. 13, an aspect of operation of the vehicle according to the embodiment is explained.

FIG. 13 is a view schematically showing an example of the vehicle according to the embodiment. A vehicle 400, shown in FIG. 13, is an electric automobile.

The vehicle 400, shown in FIG. 13, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 13, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the lithium ion secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 13) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fifth embodiment includes the battery pack according to the fourth embodiment. The embodiment, therefore, may provide a vehicle including a battery pack that excels in rate characteristics and low-temperature characteristics.

EXAMPLES

Although Examples will be described hereinafter, the embodiments are not limited to Examples to be described hereinafter.

Example 1

In an example 1, a monolayer electrode body was produced in order to find out the performance of a lithium ion secondary battery including solid electrolyte particles having first ion conductivity. The monolayer electrode produced includes a composite positive electrode, a separator, and a negative electrode. A positive electrode including solid electrolyte particles having first ion conductivity described herein is referred to as a composite positive electrode. A negative electrode including solid electrolyte particles having first ion conductivity described herein is referred to as a composite negative electrode.

<Production of Positive Electrode>

The following materials were mixed by the respective weight ratios and dispersed in a solvent of N-methyl-2-pyrrolidone (NMP) to prepare a slurry; 90 wt. % of $LiNi_{0.5}Co_{0.2}Mn_{0.3}O_2$ composite oxide with the average primary particle size of 2 μm as positive electrode active material, 3 wt. % of $Na_3Zr_2Si_2PO_{12}$ with a NASICON-type skeleton having the average primary particle size of 0.49 μm as solid electrolyte particles having first ion conductivity, 4 wt. % of graphite powder as conductive agent, and 3 wt. % of PVdF as binder. All of the stated contents of the respective materials represent their weights relative to the weight of the positive electrode active material-containing layer. Then, the slurry was applied to one surface of an aluminum alloy foil (purity 99%) in the thickness of 15 μm and then dried to obtain a laminate. This laminate was pressed to produce the composite positive electrode having a thickness of the active material-containing layer of 40 μm and an electrode density of 3.2 g/cm$^3$.

<Production of Negative Electrode>

The materials used were $Li_4Ti_5O_{12}$ particles having the average particle size of 0.6 μm and the specific surface area of 10 cm$^2$/g as negative electrode active material, graphite powder having the average particle size of 6 μm as conductive agent, and PVdF as binder. Then, 94 wt. % of the negative electrode active material, 4 wt. % of the conductive agent, and 2 wt. % of the binder relative to the total weight of the negative electrode were mixed and dispersed in an NMP solvent. This fluid dispersion was stirred with a ball mill for two hours at 1,000 rpm to prepare a slurry. The obtained slurry was applied to one surface of an aluminum alloy foil (purity 99.3%) in the thickness of 15 μm, and a coating film thus formed was dried to obtain a laminate including a current collector and an active material-containing layer. This laminate was pressed to produce the negative electrode having a thickness of the active material-containing layer of 59 μm and an electrode density of 2.2 g/cm$^3$. The negative electrode, except the current collector, had the porosity of 35%.

<Nonaqueous Electrolyte>

Propylene carbonate (PC) and diethyl carbonate (DEC) were mixed by the volume ratio of 1:2 to prepare a mixture solvent. Then, $LiPF_6$ was dissolved in this mixture solvent at the concentration of 1M to prepare a nonaqueous electrolyte.

<Production of Secondary Battery>

The composite positive electrode obtained earlier, 20 μm-thick unwoven fabric as separator, and negative electrode were stacked in layers so as to have the active material-containing layers of the composite positive electrode and of the negative electrode face each other across the separator. Thus, a laminate was obtained. The obtained laminate was wound in a roll so as to have the negative electrode located on the outermost side. Thus, an electrode group was obtained. The electrode group was subjected to hot press at 90° C. to produce a flat electrode group. The obtained electrode group was placed in a thin metallic can having the thickness of 0.25 mm and made of stainless steel. This metallic can had a valve that allows for leakage of gas at the internal pressure of 2 atm. An electrolyte was injected into the metallic can to produce a secondary battery.

Tables 1 and 2 show the materials and nonaqueous electrolyte used in the example 1, and a performance evaluation result for rate characteristics and low-temperature characteristics. Tables 1 and 2 also show results of examples 2 to 25 described later. Tables 3 and 4 show results of examples 26 to 43 and comparative examples 1 to 3 described later.

Examples 2-10

A secondary battery was produced in the same manner as in the example 1, except that the solid electrolyte shown in Table 1 was used to prepare the solid electrolyte particles having first ion conductivity.

Examples 11-15

A secondary battery was produced in the same manner as in the example 1, except that the solid electrolyte particles having first ion conductivity were added in different amounts to the composite positive electrode, as shown in Table 1.

Examples 16-19

A secondary battery was produced in the same manner as in the example 1, except that $Na_3Zr_2Si_2PO_{12}$ having the average particle sizes (average primary particle sizes) shown in Table 1 were used as solid electrolyte particles having first ion conductivity.

Examples 20-25

A secondary battery was produced in the same manner as in the example 1, except that positive electrode active material particles shown in table 2 were used as positive electrode active material.

Example 26

In an example 26, a monolayer electrode body was produced in order to find out the performance of a lithium ion secondary battery including solid electrolyte particles having first ion conductivity. The monolayer electrode body produced includes a positive electrode, a separator, and a composite negative electrode.

<Production of Positive Electrode>

The following materials were mixed by the respective weight ratios and dispersed in a solvent of N-methyl-2-pyrrolidone (NMP) to prepare a slurry; 93 wt. % of a positive electrode active material, $LiNi_{0.5}Co_{0.2}Mn_{0.3}O_2$ composite oxide having the average primary particle size of 2 μm; 4 wt. % of graphite powder as conductive agent, and 3 wt. % of PVdF as binder. All of the stated contents of the respective materials represent their weights relative to the weight of the positive electrode active material-containing layer. Then, the slurry was applied to one surface of an aluminum alloy foil (purity 99%) in the thickness of 15 μm and then dried to obtain a laminate. This laminate was pressed to produce the composite positive electrode having a thickness of the active material-containing layer of 40 μm and an electrode density of 3.2 g/cm$^3$.

<Production of Negative Electrode>

The materials used were $Li_4Ti_5O_{12}$ particles having the average particle size of 0.6 μm and the specific surface area of 10 m$^2$/g as negative electrode active material; $Na_3Zr_2Si_2PO_{12}$ with a NASICON-type skeleton having the average primary particle size of 0.49 μm as solid electrolyte particles having first ion conductivity; graphite powder having the average particle size of 6 μm as conductive agent, and PVdF as binder. Then, 91 wt. % of the negative electrode active material, 3 wt. % of the solid electrolyte particles having first ion conductivity, 4 wt. % of the conductive agent, and 2 wt. % of the binder relative to the total weight of the negative electrode were mixed and dispersed in an NMP solvent. This fluid dispersion was stirred with a ball mill for two hours at 1,000 rpm to prepare a slurry. The obtained slurry was applied to one surface of an aluminum alloy foil (purity 99.3%) in the thickness of 15 μm, and a coating film thus formed was dried to obtain a laminate including a current collector and an active material-containing layer. This laminate was pressed to produce the composite negative electrode having a thickness of the active material-containing layer of 59 μm and an electrode density of 2.2 g/cm$^3$. The negative electrode, except the current collector, had the porosity of 35%.

<Nonaqueous Electrolyte>

Propylene carbonate and diethyl carbonate were mixed by the volume ratio of 1:2 to prepare a mixture solvent. Then, $LiPF_6$ was dissolved in this mixture solvent at the concentration of 1M to prepare a nonaqueous electrolyte.

<Production of Secondary Battery>

The positive electrode obtained earlier, 20 μm-thick unwoven fabric as separator, and composite negative electrode were stacked in layers so as to have the active material-containing layers of the positive electrode and of the composite negative electrode face each other. Thus, a laminate was obtained. The obtained laminate was wound in a roll so as to have the negative electrode located on the outermost side. Thus, an electrode group was obtained. The electrode group was subjected to hot press at 90° C. to produce a flat electrode group. The obtained electrode group was placed in a thin metallic can having the thickness of 0.25 mm and made of stainless steel. This metallic can had a valve that allows for leakage of gas at the internal pressure of 2 atm. An electrolyte was injected into the metallic can to produce a secondary battery.

Example 27

A secondary battery was produced in the same manner as in the example 26, except that a niobium titanium composite oxide was used as negative electrode active material.

Examples 28-29

A secondary battery was produced in the same manner as in the example 27, except that the solid electrolyte particles having first ion conductivity were added in different amounts to the composite negative electrode, as shown in Table 3.

Examples 30-31

A secondary battery was produced in the same manner as in the example 26, except that negative electrode active material particles shown in Table 4 were used as negative electrode active material.

Example 32

In an example 32, a monolayer electrode body was produced in order to find out the performance of a lithium ion secondary battery including solid electrolyte particles having first ion conductivity. The monolayer electrode body produced includes a positive electrode, a solid electrolyte layer, and a negative electrode.

<Production of Positive Electrode>

The following materials were mixed by the respective weight ratios and dispersed in a solvent of N-methyl-2-pyrrolidone (NMP) to prepare a slurry; 93 wt. % of $LiNi_{0.5}Co_{0.2}Mn_{0.3}O_2$ composite oxide having the average primary particle size of 2 μm as positive electrode active material, 4 wt. % of graphite powder as conductive agent, and 3 wt. % of PVdF as binder. All of the stated contents of the respective materials represent their weights relative to the weight of the positive electrode active material-containing layer. Then, the slurry was applied to one surface of an aluminum alloy foil (purity 99%) in the thickness of 15 μm and then dried to obtain a laminate. This laminate was pressed to produce the composite positive electrode having a thickness of the active material-containing layer of 40 μm and an electrode density of 3.2 g/cm$^3$.

<Production of Negative Electrode>

The materials used were $Li_4Ti_5O_{12}$ particles having the average particle size of 0.6 μm and the specific surface area of 10 cm$^2$/g as negative electrode active material, graphite powder having the average particle size of 6 μm as conductive agent, and PVdF as binder. Then, 94 wt. % of the negative electrode active material, 4 wt. % of the conductive agent, and 2 wt. % of the binder relative to the total weight of the negative electrode were mixed and dispersed in an NMP solvent. This fluid dispersion was stirred with a ball mill for two hours at 1,000 rpm to prepare a slurry. The obtained slurry was applied to one surface of an aluminum alloy foil (purity 99.3%) in the thickness of 15 μm, and a coating film thus formed was dried to obtain a laminate including a current collector and an active material-containing layer. This laminate was pressed to produce the negative electrode having a thickness of the active material-containing layer of 59 μm and an electrode density of 2.2 g/cm$^3$. The negative electrode, except the current collector, had the porosity of 35%.

<Production of Solid Electrolyte Layer>

An NMP solution containing 0.5 wt. % of PVdF as binder was prepared, and $Na_3Zr_2Si_2PO_{12}$ powder with a NASICON-type skeleton having the average primary particle size of 0.49 μm was dispersed in the prepared solution. This fluid dispersion was applied onto the positive electrode and the negative electrode produced earlier and then dried to form a solid electrolyte layer on each of the positive and negative electrodes. These solid electrolyte layers were 3 μm in thickness in total.

<Nonaqueous Electrolyte>

Propylene carbonate and diethyl carbonate were mixed by the volume ratio of 1:2 to prepare a mixture solvent. Then, $LiPF_5$ was dissolved in this mixture solvent at the concentration of 1M to prepare a nonaqueous electrolyte.

<Production of Secondary Battery>

The positive electrode and the negative electrode were stacked in layers so as to have the solid electrolyte layers formed on these electrodes face each other to obtain a laminate. The obtained laminate was wound in a roll so as to have the negative electrode located on the outermost side. Thus, an electrode group was obtained. The electrode group was subjected to hot press at 90° C. to produce a flat electrode group. The obtained electrode group was placed in a thin metallic can having the thickness of 0.25 mm and made of stainless steel. This metallic can had a valve that allows for leakage of gas at the internal pressure of 2 atm. An electrolyte was injected into the metallic can to produce a secondary battery.

Example 33

A secondary battery was produced in the same manner as in the example 32, except that a gel electrolyte described below was used as nonaqueous electrolyte.

Propylene carbonate and diethyl carbonate were mixed by the volume ratio of 1:2 to prepare a mixture solvent. Then, $LiPF_6$ was dissolved in this mixture solvent at the concentration of 1M to prepare a mixture solution. A polymer, polyacrylonitrile (PAN), was added (2 wt. %) as gelling agent to this mixture solution to prepare a gel electrolyte.

Example 34

A secondary battery was produced in the same manner as in the example 33, except that polyethylene oxide (PEO) was used as gelling agent.

Example 35

<Production of Positive Electrode>
The following materials were mixed by the respective weight ratios and dispersed in a solvent of N-methyl-2-pyrrolidone (NMP) to prepare a slurry; 93 wt. % of $LiNi_{0.5}Co_{0.2}Mn_{0.3}O_2$ composite oxide having the average primary particle size of 2 µm as positive electrode active material, 4 wt. % of graphite powder as conductive agent, and 3 wt. % of PVdF as binder. All of the stated contents of the respective materials represent their weights relative to the weight of the positive electrode active material-containing layer. Then, the slurry was applied to one surface of an aluminum alloy foil (purity 99%) in the thickness of 15 µm and then dried to obtain a laminate. This laminate was pressed to produce the composite positive electrode having a thickness of the active material-containing layer of 40 µm and an electrode density of 3.2 g/cm³.
<Production of Negative Electrode>
The materials used were $Li_4Ti_5O_{12}$ particles having the average particle size of 0.6 µm and the specific surface area of 10 cm²/g as negative electrode active material, graphite powder having the average particle size of 6 µm as conductive agent, and PVdF as binder. Then, 94 wt. % of the negative electrode active material, 4 wt. % of the conductive agent, and 2 wt. % of the binder relative to the total weight of the negative electrode were mixed and dispersed in an NMP solvent. This fluid dispersion was stirred with a ball mill for two hours at 1,000 rpm to prepare a slurry. The obtained slurry was applied to one surface of an aluminum alloy foil (purity 99.3%) in the thickness of 15 µm, and a coating film thus formed was dried to obtain a laminate including a current collector and an active material-containing layer. This laminate was pressed to produce the negative electrode having a thickness of the active material-containing layer of 59 µm and an electrode density of 2.2 g/cm³. The negative electrode, except the current collector, had the porosity of 35%.
<Production of Solid Electrolyte Layer>
An NMP solution containing 0.5 wt. % of PVdF as binder was prepared, and $Na_3Zr_2Si_2PO_{12}$ powder with a NASICON-type skeleton having the average primary particle size of 0.49 µm was dispersed in the prepared solution. This fluid dispersion was applied by gravure coating to one surface of a 20 µm-thick unwoven fabric used as separator to produce a separator having a solid electrolyte layer formed on its one surface. Another separator was similarly produced in the same manner. Thus, two pieces of separators were obtained that each had a solid electrolyte layer formed on its one surface.
<Production of Secondary Battery>
These two pieces of separators with solid electrolyte layers formed on their surfaces on one side were respectively interposed between the positive and negative electrodes to obtain a laminate. The two separators were stacked in layers so as to have their solid electrolyte layers face each other, in other words, so that the other surfaces of the separators with no solid electrolyte layer formed thereon are in contact with the positive electrode active material-containing layer and the negative electrode active material-containing layer. The solid electrolyte layers were 3 µm in thickness in total. The obtained laminate was wound in a roll so as to have the negative electrode located on the outermost side. Thus, an electrode group was obtained. The electrode group was subjected to hot press at 90° C. to produce a flat electrode group. The obtained electrode group was placed in a thin metallic can having the thickness of 0.25 mm and made of stainless steel. This metallic can had a valve that allows for leakage of gas at the internal pressure of 2 atm. An electrolyte was injected into the metallic can to produce a secondary battery.

Example 36

In the example 36, a monolayer electrode body was produced which includes a composite positive electrode, a separator, and a composite negative electrode, in order to find out the performance of a lithium ion secondary battery including solid electrolyte particles having first ion conductivity.

Specifically, a secondary battery was produced in the same manner as in the example 1, except that a composite negative electrode produced as described in the example 26 was used.

Example 37

In the example 37, a monolayer electrode body which includes a composite positive electrode, a solid electrolyte layer, and a composite negative electrode, in order to find out the performance of a lithium ion secondary battery including solid electrolyte particles having first ion conductivity.

Specifically, a secondary battery was produced in the same manner as in the example 32, except that a composite positive electrode produced as described in the example 1 was used as positive electrode, and a composite negative electrode produced as described in the example 26 was used as negative electrode.

Example 38

A secondary battery was produced in the same manner as in the example 1, except that a mixture solvent containing propylene carbonate and methyl ethyl carbonate mixed by the volume ratio of 1:2 was used as solvent for nonaqueous electrolyte.

Example 39

A secondary battery was produced in the same manner as in the example 1, except that a mixture solvent containing propylene carbonate and dimethyl carbonate mixed by the volume ratio of 1:2 was used as solvent for nonaqueous electrolyte.

Example 40

A secondary battery was produced in the same manner as in the example 1, except that a nonaqueous electrolyte solution was used as nonaqueous electrolyte, which was prepared by dissolving $LiPF_6$ at the concentration of 0.5M in a mixture solvent containing propylene carbonate and diethyl carbonate mixed by the volume ratio of 1:2.

Example 41

A secondary battery was produced in the same manner as in the example 1, except that a nonaqueous electrolyte solution was used as nonaqueous electrolyte, which was prepared by dissolving $LiPF_6$ at the concentration of 2M in a mixture solvent containing propylene carbonate and diethyl carbonate mixed by the volume ratio of 1:2.

Example 42

A secondary battery was produced in the same manner as in the example 1, except that a nonaqueous electrolyte solution was used as nonaqueous electrolyte, which was prepared by dissolving lithium bis(trifluoromethylsulfonyl) imide (LiTFSI) at the concentration of LM in a mixture solvent containing propylene carbonate and diethyl carbonate mixed by the volume ratio of 1:2.

Comparative Example 1

In a comparative example 1, the solid electrolyte particles having first ion conductivity were added to neither of the positive electrode nor the negative electrode.

Specifically, a secondary battery was produced in the same manner as in the example 1, except that a positive electrode produced as described in the example 26 was used.

Comparative Example 2

A secondary battery was produced in the same manner as in the example 1, except that a positive electrode produced in the following process was used.

First, a mixture solution was prepared, in which the following materials were mixed; a composite oxide, $LiNi_{0.5}Co_{0.2}Mn_{0.3}O_2$, with the average primary particle size of 2 μm as positive electrode active material, an aqueous solution containing carboxymethyl cellulose (CMC) (1%), and $Na_3Zr_2Si_2PO_{12}$ with a NASICON-type skeleton having the average primary particle size of 0.49 μm as solid electrolyte particles having first ion conductivity. The content of the solid electrolyte particles having first ion conductivity in this mixture solution was 1 part by weight relative to 100 parts by weight of the active material particles. The prepared mixture solution was applied onto a Teflon (registered trademark) sheet and then dried for 40 hours in an environment at 80° C. to adequately evaporate water content from the mixture. As a result, a composite positive electrode active material in the form of powder was obtained. Then, 93 wt. % of the powdered, composite positive electrode active material, 4 wt. % of a conductive agent, and 3 wt. % of a binder to the total weight of the positive electrode were added to and dispersed in a solvent of N-methyl-2-pyrrolidone (NMP) to prepare a slurry. This slurry was applied to one surface of an aluminum alloy foil (purity 99%) having the thickness of 15 μm, and a coating film thus formed was dried to obtain a laminate including a current collector and an active material-containing layer. The obtained laminate was pressed to produce the composite positive electrode having a thickness of the active material-containing layer of 40 μm and an electrode density of 3.2 g/cm$^3$.

Comparative Example 3

A secondary battery was produced in the same manner as in the example 1, except that solid electrolyte particles having lithium ion conductivity were used instead of solid electrolyte particles having first ion conductivity. The solid electrolyte particles having lithium ion conductivity used were LLZ($Li_7La_3Zr_2O_{12}$) powder having the average primary particle size of 1 μm.

Comparative Example 4

A secondary battery was produced in the same manner as in the example 1, except that a positive electrode produced in the following process was used. The comparative example 4, by employing dry blending, started with preparing a composite positive electrode active material in the form of powder in which solid electrolyte particles having first ion conductivity were adsorbed to surfaces of active material particles, and then produced a positive electrode using this powdered material.

A composite oxide, $LiNi_{0.5}Co_{0.2}Mn_{0.3}O_2$, having the average primary particle size of 2 μm as positive electrode active material, and $Na_3Zr_2Si_2PO_{12}$ with a NASICON-type skeleton having the average primary particle size of 0.49 μm as solid electrolyte particles having first ion conductivity, were mixed by dry blending by the weight ratio of 80:20 to prepare a composite positive electrode active material in the form of powder in which $Na_3Zr_2Si_2PO_{12}$ particles were adsorbed to surfaces of active material particles. Then, 93 wt. % of the powdered, composite positive electrode active material, 4 wt. % of a conductive agent, and 3 wt. % of a binder to the total weight of the positive electrode were added to and dispersed in a solvent of N-methyl-2-pyrrolidone (NMP) to prepare a slurry. This slurry was applied to one surface of an aluminum alloy foil (purity 99%) having the thickness of 15 μm, and a coating film thus formed was dried to obtain a laminate including a current collector and an active material-containing layer. The obtained laminate was pressed to produce the composite positive electrode having a thickness of the active material-containing layer of 40 μm and an electrode density of 3.2 g/cm3.

Comparative Example 5

A secondary battery was produced in a manner similar to the example 1, except that a positive electrode produced in the following process was used. The comparative example 5, by employing sol☐gel process, started with preparing a composite positive electrode active material in the form of powder in which solid electrolyte particles having first ion conductivity were adsorbed to surfaces of active material particles, and then produced a positive electrode using this powdered material.

The following materials were mixed and stirred, and then filtered; a composite oxide, $LiNi_{0.5}Co_{0.2}Mn_{0.3}O_2$, having the average primary particle size of 2 μm as positive electrode active material, a titanium tetraisopropoxide-containing solution, and a solution containing zirconium nitrate hydrate, sodium hydroxide, phosphoric acid, and sodium silicate. The powder obtained after filtering was sintered for six hours at 850° C. to prepare a composite positive electrode active material in the form of powder in which $Na_3Zr_2Si_2PO_{12}$ particles were adsorbed to surfaces of active material particles. Then, 93 wt. % of the powdered, composite positive electrode active material, 4 wt. % of a conductive agent, and 3 wt. % of a binder to the total weight of the positive electrode were added to and dispersed in a solvent of N-methyl-2-pyrrolidone (NMP) to prepare a slurry. This slurry was applied to one surface of an aluminum alloy foil (purity 99%) having the thickness of 15 μm, and a coating film thus formed was dried to obtain a laminate including a current collector and an active material-containing layer. The obtained laminate was pressed to produce the composite positive electrode having a thickness of the active material-containing layer of 40 μm and an electrode density of 3.2 g/cm$^3$.

<ICP Analysis>

The ICP analysis was performed as described in the first embodiment, which identified, as shown in Tables 1 and 3, compositions of the solid electrolyte particles having first ion conductivity included in the lithium ion secondary batteries according to the respective examples.

<SEM Observation>

Further, the SEM observation performed as described in the first embodiment demonstrates the presence of solid electrolyte particles having first ion conductivity away from the active material particles in the active material-containing layers included in the batteries according to the examples 1 to 42. In the results of the comparative examples 1 to 5, however, the SEM observation could not detect the presence of any solid electrolyte particles having first ion conductivity away from the active material particles.

Figure 14:
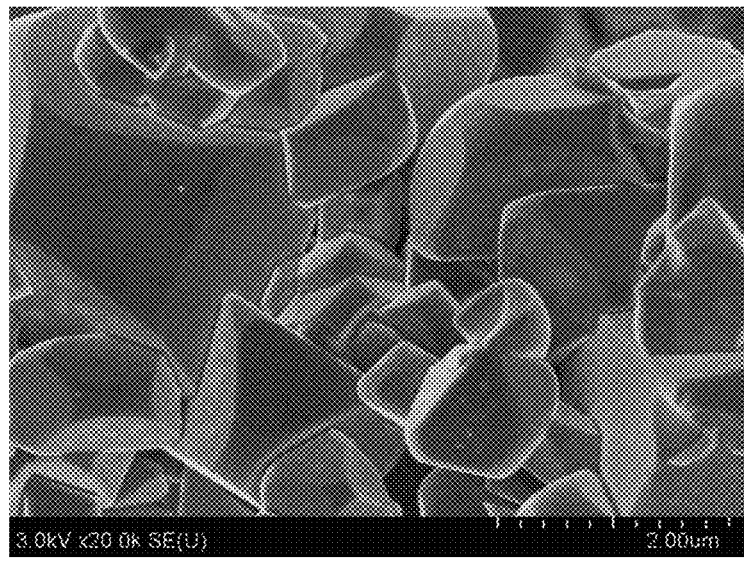
FIG. 14 is an SEM (Scanning Electron Microscope) image according to the example 1.
Figure 15:
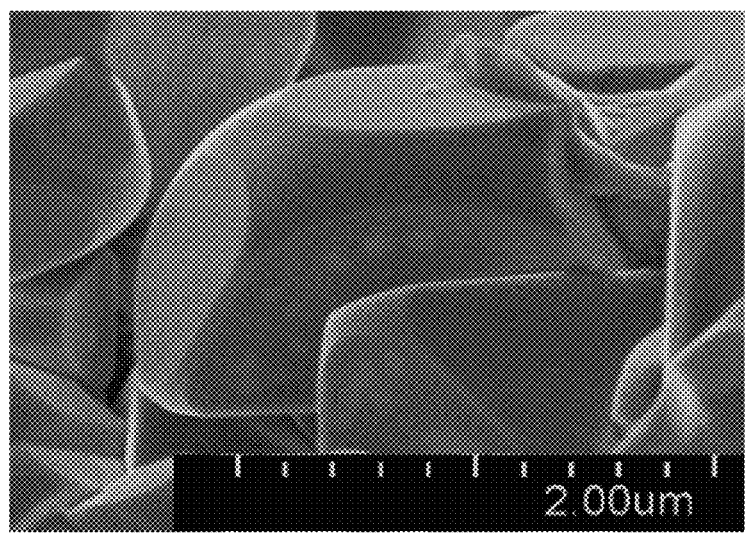
FIG. 15 is the SEM image of FIG. 14 enlarged in part.

FIGS. 14 to 19 show SEM images obtained from the example 1 and the comparative examples 2 and 5. FIG. 14 is an SEM image of the example 1. FIG. 15 is the SEM image of FIG. 14 enlarged in part. FIG. 16 is an SEM image of the comparative example 2. FIG. 17 is the SEM image of FIG. 16 enlarged in part. FIG. 18 is an SEM image of the comparative example 5. FIG. 19 is the SEM image of FIG. 18 enlarged in part.

Further, the SEM image of FIG. 14 shows the presence of solid electrolyte particles having first ion conductivity away from the active material particles in the positive electrode active material-containing layer according to the example 1. The area ratio of the solid electrolyte particles having first ion conductivity was 0.8% to the total vision field area of the SEM image of FIG. 14.

According to the SEM image of FIG. 16, absence of any solid electrolyte particles having first ion conductivity away from the active material particles in the positive electrode active material-containing layer according to the comparative example 2 was confirmed. In the positive electrode active material-containing layer obtained in the comparative example 2, the solid electrolyte particles having first ion conductivity are in contact with the active material particles. Even after the pretreatment performed as described in connection with the SEM observation in the first embodiment, the solid electrolyte particles having first ion conductivity do not detach from the active material particles. The enlarged view of FIG. 17 shows, in a circle 50, solid electrolyte particles 13 having first ion conductivity that are adsorbed to active material particles 11. The area ratio of the solid electrolyte particles having first ion conductivity was 30% to the total vision field area of the SEM image of FIG. 16.

According to The SEM image of FIG. 18, absence of any solid electrolyte particles having first ion conductivity away from the active material particles in the positive electrode active material-containing layer according to the comparative example 5 was confirmed. In the positive electrode active material-containing layer obtained in the comparative example 5, the solid electrolyte particles having first ion conductivity are in contact with the active material particles. Even after the pretreatment performed as described in connection with the SEM observation in the first embodiment, the solid electrolyte particles having first ion conductivity do not detach from the active material particles. The enlarged view of FIG. 19 shows, in circles 50, solid electrolyte particles 13 having first ion conductivity that are adsorbed to active material particles 11. The area ratio of the solid electrolyte particles having first ion conductivity was 15% to the total vision field area of the SEM image of FIG. 18.

<Performance Evaluation for Rate Characteristics>

The batteries were tested for rate characteristics in an environment at 25° C. As for charge and discharge of the batteries, the batteries were charged to 3.0 V at 1 C and then discharged to 1.7 V at 1 C, and capacities of the batteries were checked. Then, the battery capacities were checked again after a discharge current was discharged at 20 C. A discharge capacity at 1 C was divided by a discharge capacity at 20 C and multiplied by 100 to calculate a 1 C/20 C capacity retention (ratio). The 1 C/20 C capacity retention (ratio) serves as an indicator for evaluation of rate characteristics. Tables 1 and 3 show evaluation results.

<Evaluation of Low-Temperature Dischargeability at −30° C.>

The batteries were tested for dischargeability in an environment at −30° C. As for charge and discharge of the batteries, the batteries were charged to 3.0 V at 1 C in an environment at 25° C. and then left at rest for three hours in an environment at −30° C. Then, the batteries were discharged to 1.7 V at 1 C, and their capacities were checked. A discharge capacity at −30° C. relative to the discharge capacity at 25° C. measured in the performance evaluation for rate characteristics was calculated (discharge capacity at −30° C./discharge capacity at 25° C.×100). The obtained values each serves as an indicator for evaluation of low-temperature characteristics. Tables 1 and 3 show evaluation results.

TABLE 1

| | Average particle size of solid electrolyte particles (μm) | Type of solid electrolyte particles having first ion conductivity | Solid electrolyte mixed layer | Content of solid electrolyte particles | Area ratio (%) | Ratio of number of particles with no contact (%) | Low-temperature performance (30° C./25° C.), Capacity retention (%) | 25° C. rate performance (20 C./1 C.), Capacity retention (%) |
|---|---|---|---|---|---|---|---|---|
| Example 1 | 0.49 | $Na_3Zr_2Si_2PO_{12}$ | Positive electrode | 3 wt. % | 0.8 | 100 | 62 | 74 |
| Example 2 | 0.45 | $Na_2Zr_2SiP_2O_{12}$ | Positive electrode | 3 wt. % | 0.7 | 95 | 62 | 75 |
| Example 3 | 0.47 | $Na_{3.5}Zr_2Si_{2.5}P_{0.5}O_{12}$ | Positive electrode | 3 wt. % | 0.8 | 100 | 65 | 72 |
| Example 4 | 0.44 | $Na_{1.5}Zr_2Si_{0.5}P_{2.5}O_{12}$ | Positive electrode | 3 wt. % | 0.8 | 93 | 66 | 74 |
| Example 5 | 0.49 | $Na_2B_{10}H_{10}$ | Positive electrode | 3 wt. % | 1 | 98 | 60 | 74 |
| Example 6 | 0.48 | $Na_2O·11Al_2O_3$ | Positive electrode | 3 wt. % | 1.1 | 95 | 61 | 72 |
| Example 7 | 0.49 | $K_2Zr_2SiP_2O_{12}$ | Positive electrode | 3 wt. % | 0.9 | 100 | 63 | 73 |
| Example 8 | 0.45 | $CaZr_2SiP_2O_{12}$ | Positive electrode | 3 wt. % | 0.8 | 95 | 60 | 75 |
| Example 9 | 0.45 | $MgZr_2SiP_2O_{12}$ | Positive electrode | 3 wt. % | 0.9 | 90 | 60 | 75 |
| Example 10 | 0.48 | $AlZr_2Si_2PO_{12}$ | Positive electrode | 3 wt. % | 1 | 96 | 63 | 71 |
| Example 11 | 0.49 | $Na_3Zr_2Si_2PO_{12}$ | Positive electrode | 0.1 wt. % | 0.3 | 100 | 55 | 73 |

TABLE 1-continued

| | Average particle size of solid electrolyte particles (μm) | Type of solid electrolyte particles having first ion conductivity | Solid electrolyte mixed layer | Content of solid electrolyte particles | Area ratio (%) | Ratio of number of particles with no contact (%) | Low-temperature performance (30° C./25° C.), Capacity retention (%) | 25° C. rate performance (20 C./1 C.), Capacity retention (%) |
|---|---|---|---|---|---|---|---|---|
| Example 12 | 0.49 | Na$_3$Zr$_2$Si$_2$PO$_{12}$ | Positive electrode | 1 wt. % | 0.5 | 100 | 59 | 74 |
| Example 13 | 0.49 | Na$_3$Zr$_2$Si$_2$PO$_{12}$ | Positive electrode | 5 wt. % | 1.2 | 90 | 68 | 70 |
| Example 14 | 0.49 | Na$_3$Zr$_2$Si$_2$PO$_{12}$ | Positive electrode | 10 wt. % | 2.1 | 82 | 72 | 77 |
| Example 15 | 0.49 | Na$_3$Zr$_2$Si$_2$PO$_{12}$ | Positive electrode | 20 wt. % | 5.6 | 70 | 78 | 81 |
| Example 16 | 0.1 | Na$_3$Zr$_2$Si$_2$PO$_{12}$ | Positive electrode | 3 wt. % | 0.4 | 90 | 69 | 76 |
| Example 17 | 1.2 | Na$_3$Zr$_2$Si$_2$PO$_{12}$ | Positive electrode | 3 wt. % | 2.4 | 80 | 60 | 70 |
| Example 18 | 5.6 | Na$_3$Zr$_2$Si$_2$PO$_{12}$ | Positive electrode | 3 wt. % | 6.7 | 65 | 57 | 69 |
| Example 19 | 10.4 | Na$_3$Zr$_2$Si$_2$PO$_{12}$ | Positive electrode | 3 wt. % | 9.6 | 60 | 54 | 65 |
| Example 20 | 0.49 | Na$_3$Zr$_2$Si$_2$PO$_{12}$ | Positive electrode | 3 wt. % | 0.8 | 100 | 62 | 60 |
| Example 21 | 0.49 | Na$_3$Zr$_2$Si$_2$PO$_{12}$ | Positive electrode | 3 wt. % | 0.7 | 95 | 65 | 75 |
| Example 22 | 0.49 | Na$_3$Zr$_2$Si$_2$PO$_{12}$ | Positive electrode | 3 wt. % | 0.8 | 100 | 66 | 62 |
| Example 23 | 0.49 | Na$_3$Zr$_2$Si$_2$PO$_{12}$ | Positive electrode | 3 wt. % | 0.8 | 93 | 60 | 76 |
| Example 24 | 0.49 | Na$_3$Zr$_2$Si$_2$PO$_{12}$ | Positive electrode | 3 wt. % | 1 | 98 | 61 | 70 |
| Example 25 | 0.49 | Na$_3$Zr$_2$Si$_2$PO$_{12}$ | Positive electrode | 3 wt. % | 1.1 | 95 | 63 | 74 |

TABLE 2

| | Type of positive electrode active material | Average primary particle size of positive electrode active material (μm) | Type of negative electrode active material | Average primary particle size of negative electrode active material (μm) | Nonaqueous electrolyte |
|---|---|---|---|---|---|
| Example 1 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 2 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 3 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 4 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 5 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 6 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 7 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 8 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 9 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 10 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 11 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 12 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 13 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 14 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 15 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 16 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 17 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 18 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 19 | LiNi$_{0.5}$Co$_{0.2}$Mn$_{0.3}$O$_2$ | 2 | Li$_4$Ti$_5$O$_{12}$ | 0.6 | 1M LiPF$_6$ + PC:DEC = 1:2 (vol. %) |
| Example 20 | LiNi$_{0.6}$Co$_{0.2}$Mn$_{0.2}$O$_2$ | 1 | Li$_4$Ti$_5$O$_{12}$ | 0.6 | 1M LiPF$_6$ + PC:DEC = 1:2 (vol. %) |
| Example 21 | LiNi$_{0.33}$Co$_{0.33}$Mn$_{0.33}$O$_2$ | 0.8 | Li$_4$Ti$_5$O$_{12}$ | 0.6 | 1M LiPF$_6$ + PC:DEC = 1:2 (vol. %) |
| Example 22 | LiNi$_{0.8}$Co$_{0.1}$Mn$_{0.1}$O$_2$ | 5 | Li$_4$Ti$_5$O$_{12}$ | 0.6 | 1M LiPF$_6$ + PC:DEC = 1:2 (vol. %) |
| Example 23 | LiMn$_2$O$_4$ | 2 | Li$_4$Ti$_5$O$_{12}$ | 0.6 | 1M LiPF$_6$ + PC:DEC = 1:2 (vol. %) |
| Example 24 | LiCoO$_2$ | 4 | Li$_4$Ti$_5$O$_{12}$ | 0.6 | 1M LiPF$_6$ + PC:DEC = 1:2 (vol. %) |
| Example 25 | LiFePO$_4$ | 0.5 | Li$_4$Ti$_5$O$_{12}$ | 0.6 | 1M LiPF$_6$ + PC:DEC = 1:2 (vol. %) |

TABLE 3

| | Average particle size of solid electrolyte particles (μm) | Type of solid electrolyte particles having first ion conductivity | Solid electrolyte mixed layer | Content of solid electrolyte particles | Area ratio (%) | Ratio of number of particles with no contact (%) | Low-temperature performance (30° C./25° C.), Capacity retention (%) | 25° C. rate performance (20 C./1 C.), Capacity retention (%) |
|---|---|---|---|---|---|---|---|---|
| Example 26 | 0.49 | Na$_3$Zr$_2$Si$_2$PO$_{12}$ | Negative electrode | 3 wt. % | 0.8 | 99 | 62 | 73 |
| Example 27 | 0.49 | Na$_3$Zr$_2$Si$_2$PO$_{12}$ | Negative electrode | 3 wt. % | 0.7 | 100 | 61 | 76 |
| Example 28 | 0.49 | Na$_3$Zr$_2$Si$_2$PO$_{12}$ | Negative electrode | 5 wt. % | 1.1 | 89 | 66 | 79 |
| Example 29 | 0.49 | Na$_3$Zr$_2$Si$_2$PO$_{12}$ | Negative electrode | 20 wt. % | 5.2 | 75 | 79 | 81 |
| Example 30 | 0.49 | Na$_3$Zr$_2$Si$_2$PO$_{12}$ | Negative electrode | 3 wt. % | 0.5 | 100 | 60 | 68 |
| Example 31 | 0.49 | Na$_3$Zr$_2$Si$_2$PO$_{12}$ | Negative electrode | 2 wt. % | 0.8 | 98 | 61 | 70 |

TABLE 3-continued

| | Average particle size of solid electrolyte particles (μm) | Type of solid electrolyte particles having first ion conductivity | Solid electrolyte mixed layer | Content of solid electrolyte particles | Area ratio (%) | Ratio of number of particles with no contact (%) | Low-temperature performance (30° C./25° C.), Capacity retention (%) | 25° C. rate performance (20 C./1 C.), Capacity retention (%) |
|---|---|---|---|---|---|---|---|---|
| Example 32 | 0.49 | $Na_3Zr_2Si_2PO_{12}$ | Solid electrode layer | Thickness of 3 μm | 0 | 100 | 65 | 75 |
| Example 33 | 0.49 | $Na_3Zr_2Si_2PO_{12}$ | Solid electrode layer | Thickness of 3 μm | 0.1 | 100 | 59 | 70 |
| Example 34 | 0.49 | $Na_3Zr_2Si_2PO_{12}$ | Solid electrode layer | Thickness of 3 μm | 0 | 100 | 55 | 68 |
| Example 35 | 0.49 | $Na_3Zr_2Si_2PO_{12}$ | Solid electrode layer. (two 20 μm separators) | Thickness of 3 μm | 0 | 100 | 58 | 69 |
| Example 36 | 0.49 | $Na_3Zr_2Si_2PO_{12}$ | Positive electrode, negative electrode | 3 wt. % | 0.8, 0.8 | 97 | 69 | 79 |
| Example 37 | 0.49 | $Na_3Zr_2Si_2PO_{12}$ | Positive electrode, negative electrode, solid electrode layer | 3 wt. %, and Thickness of 3 μm | 0.9, 0.9 | 98 | 81 | 88 |
| Example 38 | 0.49 | $Na_3Zr_2Si_2PO_{12}$ | Positive electrode | 3 wt. % | 0.8 | 95 | 71 | 80 |
| Example 39 | 0.49 | $Na_3Zr_2Si_2PO_{12}$ | Positive electrode | 3 wt. % | 0.7 | 100 | 70 | 82 |
| Example 40 | 0.49 | $Na_3Zr_2Si_2PO_{12}$ | Positive electrode | 3 wt. % | 0.8 | 93 | 51 | 60 |
| Example 41 | 0.49 | $Na_3Zr_2Si_2PO_{12}$ | Positive electrode | 3 wt. % | 0.8 | 98 | 55 | 67 |
| Example 42 | 0.49 | $Na_3Zr_2Si_2PO_{12}$ | Positive electrode | 3 wt. % | 0.9 | 95 | 54 | 61 |
| Comparative example 1 | — | — | — | — | 0 | 100 | 30 | 41 |
| Comparative example 2 | 0.49 | $Na_3Zr_2Si_2PO_{12}$ | Positive electrode (surface of positive electrode active material particle) | 3 wt. % | 30 | 10 | 35 | 45 |
| Comparative example 3 | 0.49 | $Li_7La_8Zr_2O_{12}$ | Positive electrode | 3 wt. % | 0.8 | 98 | 39 | 53 |
| Comparative example 4 | 0.49 | $Na_3Zr_2Si_2PO_{12}$ | Positive electrode (surface of positive electrode active material particle) | 3 wt. % | 25 | 15 | 33 | 44 |
| Comparative example 5 | 0.1 | $Na_3Zr_2Si_2PO_{12}$ | Positive electrode (surface of positive electrode active material particle) | 3 wt. % | 15 | 5 | 40 | 51 |

TABLE 4

| | Type of positive electrode active material | Average primary particle size of positive electrode active material (μm) | Type of negative electrode active material | Average primary particle size of negative electrode active material (μm) | Nonaqueous electrolyte |
|---|---|---|---|---|---|
| Example 26 | $LiNi_{0.5}Co_{0.2}Mn_{0.3}O_2$ | 2 | $Li_4Ti_5O_{19}$ | 0.6 | 1M $LiPF_6$ + PC:DEC = 1:2 (vol. %) |
| Example 27 | $LiNi_{0.5}Co_{0.2}Mn_{0.3}O_2$ | 2 | $Nb_2TiO_7$ | 2 | 1M $LiPF_6$ + PC:DEC = 1:2 (vol. %) |
| Example 28 | $LiNi_{0.5}Co_{0.2}Mn_{0.3}O_2$ | 2 | $Nb_2TiO_7$ | 2 | 1M $LiPF_6$ + PC:DEC = 1:2 (vol. %) |
| Example 29 | $LiNi_{0.5}Co_{0.2}Mn_{0.3}O_2$ | 2 | $Nb_2TiO_7$ | 2 | 1M $LiPF_6$ + PC:DEC = 1:2 (vol. %) |
| Example 30 | $LiNi_{0.5}Co_{0.2}Mn_{0.3}O_2$ | 2 | $TiO_2$ | 0.5 | 1M $LiPF_6$ + PC:DEC = 1:2 (vol. %) |
| Example 31 | $LiNi_{0.5}Co_{0.2}Mn_{0.3}O_2$ | 2 | $Li_2Na_{1.8}Ti_{0.8}Nb_{0.2}O_{14}$ | 1 | 1M $LiPF_6$ + PC:DEC = 1:2 (vol. %) |
| Example 32 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Example 33 | $LiNi_{0.5}Co_{0.2}Mn_{0.3}O_2$ | 2 | $Li_4Ti_5O_{12}$ | 0.6 | Gel electrolyte (PAN) |
| Example 34 | $LiNi_{0.5}Co_{0.2}Mn_{0.3}O_2$ | 2 | $Li_4Ti_5O_{12}$ | 0.6 | Gel electrolyte (PEO) |
| Example 35 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Example 36 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Example 37 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Example 38 | $LiNi_{0.5}Co_{0.2}Mn_{0.3}O_2$ | 2 | $Li_4Ti_5O_{12}$ | 0.6 | 1M $LiPF_6$ + PC:MEC = 1:2 (vol. %) |
| Example 39 | $LiNi_{0.5}Co_{0.2}Mn_{0.3}O_2$ | 2 | $Li_4Ti_5O_{12}$ | 0.6 | 1M $LiPF_6$ + PC:DMC = 1:2 (vol. %) |
| Example 40 | $LiNi_{0.5}Co_{0.2}Mn_{0.3}O_2$ | 2 | $Li_4Ti_5O_{12}$ | 0.6 | 0.5M $LiPF_6$ + PC:DEC = 1:2 (vol. %) |
| Example 41 | $LiNi_{0.5}Co_{0.2}Mn_{0.3}O_2$ | 2 | $Li_4Ti_5O_{12}$ | 0.6 | 2M $LiPF_6$ + PC:DEC = 1:2 (vol. %) |
| Example 42 | $LiNi_{0.5}Co_{0.2}Mn_{0.3}O_2$ | 2 | $Li_4Ti_5O_{12}$ | 0.6 | 1M LiTFSI + PC:DEC = 1:2 (vol. %) |
| Comparative example 1 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Comparative example 2 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Comparative example 3 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Comparative example 4 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |
| Comparative example 5 | $LiNi_{0.5}Co_{0.2}Mn_{0.3}O_2$ | 2 | $Li_4Ti_5O_{12}$ | 0.6 | 1M $LiPF_6$ + PC:DEC = 1:2 (vol. %) |

Referring to Tables 1 and 3, the column, "Solid electrolyte mixed layer", shows which of the positive electrode, negative electrode, and solid electrolyte layer includes the solid electrolyte particles having first ion conductivity. The column, "Content of solid electrolyte particles", shows the content, expressed in wt. %, of the solid electrolyte particles having first ion conductivity in the active material-containing layer of the (positive or negative) electrode. As for the examples 32 to 35, this column shows a thickness value of the solid electrolyte layer. As for the example 36, this column shows a content value of the particles in the positive and negative electrodes. As for the example 37, this column shows a content value of the particles in the positive and negative electrodes and a thickness value of the solid electrolyte layer. The column, "Area ratio (%)", shows the area ratio, expressed in percentage, of the solid electrolyte particles having first ion conductivity to the total visual field area of the SEM image. The column, "Area ratio (%)", of the examples 36 and 37, however, shows area ratios in the positive electrode active material-containing layer and the negative electrode active material-containing layer in the mentioned order. The column, "Ratio of number of particles (%) with no contact", shows the ratio, expressed in percentage, of the active material particles with no contact with the solid electrolyte particles having first ion conductivity to the total number of active material particles present in the visual field of the SEM image.

In Tables 1 and 3, the column, "25° C. rate performance (20 C/1 C)—capacity retention (ratio) (%)", shows a value, expressed by percentage, of the discharge capacity at 20 C divided by the discharge capacity at 1 C and multiplied by 100. The column, "Low-temperature performance (−30° C./25° C.)—capacity retention (ratio) (%)", shows a value, expressed in percentage, of the discharge capacity at −30° C. divided by the discharge capacity at 25° C. and multiplied by 100.

Tables 1 to 4 may teach the following facts.

In the lithium ion secondary batteries produced in the examples 1 to 31 and 36 to 42, the solid electrolyte particles having first ion conductivity that are present away from the active material particles were included in at least one of the positive electrode and the negative electrode. The lithium ion secondary batteries according to these examples were found to superior the batteries according to the comparative examples 1 to 5 in both rate characteristics and low-temperature characteristics. This result may attribute to accelerated desolvation of the lithium ions achieved by higher adsorbability of the solvent molecules to the solid electrolyte particles having first ion conductivity.

As is known from the examples 1 to 42, remarkable rate characteristics and low-temperature characteristics were achieved in the lithium ion secondary batteries in which an area occupied by the solid electrolyte particles having first ion conductivity was 20% or less of the total visual field area of the SEM image.

As is known from the example 36, remarkable rate characteristics and low-temperature characteristics were achieved in the lithium ion secondary battery in which the solid electrolyte particles having first ion conductivity were included in both the positive and negative electrodes, as compared with the example 1 in which the solid electrolyte particles having first ion conductivity were included in the positive electrode alone. As is known from the example 37, the rate characteristics and low-temperature characteristics were further improved in the lithium ion secondary battery in which the positive and negative electrodes both included the solid electrolyte particles having first ion conductivity and the solid electrolyte layer including the solid electrolyte particles having first ion conductivity was interposed between the positive and negative electrodes.

In the lithium ion secondary batteries produced in the examples 32 to 35, the solid electrolyte particles having first ion conductivity were included in neither of the positive electrode nor the negative electrode. The batteries of these examples, however, had the solid electrolyte layer apart from the electrodes, and the solid electrolyte particles having first ion conductivity were included in the solid electrolyte layers of these batteries. These solid electrolyte layers, therefore, included the solid electrolyte particles having first ion conductivity that were present away from the positive electrode active material particles and/or negative electrode active material particles. The lithium ion secondary batteries according to the examples 32 to 35 superior the batteries according to the comparative examples 1 to 5 in both the rate characteristics and low-temperature characteristics.

As is known from the examples 11 to 15, a larger content of the solid electrolyte particles having first ion conductivity in the active material-containing layer lead to better rate characteristics and low-temperature characteristics.

As is known from the examples 16 to 19, better rate characteristics and low-temperature characteristics were achieved with the solid electrolyte particles having first ion conductivity and an average primary particle size from 0.1 μm to 5 μm than the solid electrolyte particles having an average primary particle size beyond this numerical range. A reason for such a result may be, as more solid electrolyte particles having first ion conductivity have smaller primary particle sizes, the particles with no contact with the active material particles increase, accelerating desolvation of the lithium ions.

In the comparative example 1, neither of the positive electrode nor the negative electrode included the solid electrolyte particles having first ion conductivity. This appears to be the reason why the rate characteristics and low-temperature characteristics in this example were both inferior to those of the examples 1 to 42.

In the comparative example 2, the active material particles and the solid electrolyte particles having first ion conductivity were dispersed in the binder-containing solution to prepare the composite active material powder, and the powder thus prepared was used to produce the positive electrode. In this example, the solid electrolyte particles having first ion conductivity were in contact with all of the active material particles within the visual field of the SEM image.

In the comparative example 3, the solid electrolyte particles having lithium ion conductivity were included in the positive electrode active material-containing layer. The positive electrode of the comparative example 3 included abundant solid electrolyte particles having lithium ion conductivity that were present away from the active material particles. In this example, the rate characteristics and low-temperature characteristics were inferior to those of the examples 1 to 42. A reason for such a result may be inadequate adsorption of the solvent molecules to the solid electrolyte particles having lithium ion conductivity that were present away from the active material particles. Such inadequate adsorption may have resulted in failure to accelerate desolvation of the lithium ions in the vicinity of surfaces of the active material particles.

In the comparative example 4, the active material particles and the solid electrolyte particles having first ion conductivity were mixed by dry blending to prepare the composite active material powder, and the powder thus prepared was used to produce the positive electrode. In this example, the solid electrolyte particles having first ion conductivity were in contact with all of the active material particles within the visual field of the SEM image.

In the comparative example 5, the powder was prepared in which the solid electrolyte particles having first ion conductivity were adsorbed to the active material particles, and the powder thus prepared was used to produce the positive electrode. In this example, the solid electrolyte particles having first ion conductivity-were in contact with all of the active material particles within the visual field of the SEM image.

According to at least one of the embodiments and examples described thus far, an electrode is provided. The electrode includes an active material-containing layer including active material particles and solid electrolyte particles being present away from the active material particles. The active material particles have lithium ion conductivity. The solid electrolyte particles have first ion conductivity. The solid electrolyte particles include a first ion that is at least one selected from the group consisting of an alkali metal ion excluding a lithium ion, a Ca ion, an Mg ion, and an Al ion. The electrode may successfully provide a lithium ion secondary battery that excels in rate characteristics and low-temperature characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising an active material-containing layer comprising:
    active material particles having lithium ion conductivity; and
    solid electrolyte particles being present away from the active material particles,
    wherein the solid electrolyte particles comprise a first ion being at least one selected from the group consisting of an alkali metal ion excluding a lithium ion, a Ca ion, an Mg ion, and an Al ion, and
    the solid electrolyte particles have first ion conductivity, and have a higher ionic conductance for the first ion than for the lithium ion.

2. The electrode according to claim 1, wherein
    in a scanning electron microscope (SEM) image with respect to the active material-containing layer, a ratio of an area occupied by the solid electrolyte particles is less than or equal to 20% of a total visual field area of the scanning electron microscope (SEM) image.

3. The electrode according to claim 1, wherein
    a ratio of a weight of the solid electrolyte particles relative to a weigh active material-containing layer is in a range of 0.1 wt. % to 30 wt. %.

4. The electrode according to claim 1, wherein
    the solid electrolyte particles have an average particle size in a range of 0.1 μm to 5 μm.

5. The electrode according to claim 1, wherein
    the solid electrolyte particles further comprise a lithium ion, and
    in the solid electrolyte particles, a concentration of the first ion is greater than a concentration of the lithium ion.

6. The electrode according to claim 1, wherein
    the solid electrolyte particles comprise at least one selected from the group consisting of $Na_3Zr_2Si_2PO_{12}$, $Na_2Zr_2SiP_2O_{12}$, $Na_{3.5}Zr_2Si_{2.5}P_{0.5}O_{12}$, $Na_{1.5}Zr_2Si_{0.5}P_{2.5}O_{12}$, $Na_2B_{10}H_{10}$, $Na_2O.11Al_2O_3$, $K_2Zr_2SiP_2O_{12}$, $CaZr_2SiP_2O_{12}$, $MgZr_2SiP_2O_{12}$, and $AlZr_2Si_2PO_{12}$.

7. The electrode according to claim 1 for use for a lithium ion secondary battery.

8. A laminate, comprising:
    the electrode according to claim 1; and
    a solid electrolyte layer,
    the solid electrolyte layer comprising the solid electrolyte particles present away from the active material particles.

9. A laminate, comprising:
    an electrode that comprises an active material-containing layer; and
    a solid electrolyte layer,
    wherein the active material-containing layer comprises active material particles having lithium ion conductivity,
    the solid electrolyte layer comprises solid electrolyte particles being present away from the active material particles, and
    the solid electrolyte particles comprise a first ion being at least one selected from the group consisting of an alkali metal ion excluding lithium ion, a Ca ion, an M ion, and an Al ion, and
    the solid electrolyte particles have first ion conductivity, and have a higher ionic conductance for the first ion than for the lithium ion.

10. The laminate according to claim 9, wherein
    the solid electrolyte particles further comprise a lithium ion, and
    in the solid electrolyte particles, a concentration of the first ion is greater than a concentration of the lithium ion.

11. The laminate according to claim 9, wherein
    the solid electrolyte particles comprise at least one selected from the group consisting of $Na_3Zr_2Si_2PO_{12}$, $Na_2Zr_2SiP_2O_{12}$, $Na_{3.5}Zr_2Si_{2.5}P_{0.5}O_{12}$, $Na_{1.5}Zr_2Si_{0.5}P_{2.5}O_{12}$, $Na_2B_{10}H_{10}$, $Na_2O.11Al_2O_3$, $K_2Zr_2SiP_2O_{12}$, $CaZr_2SiP_2O_{12}$, $MgZr_2SiP_2O_{12}$, and $AlZr_2Si_2PO_{12}$.

12. A lithium ion secondary battery, comprising:
    a nonaqueous electrolyte; and
    the electrode according to claim 1.

13. A lithium ion secondary battery, comprising:
    a nonaqueous electrolyte; and
    the laminate according to claim 8.

14. A battery pack comprising the lithium ion secondary battery according to claim 12.

15. The battery pack according to claim 14, further comprising:
    an external power distribution terminal; and
    a protective circuit.

16. The battery pack according to claim 14, comprising a plurality of the lithium ion secondary battery, wherein
    the lithium ion secondary batteries are electrically connected to in series, in parallel, or in combination of series connection and parallel connection.

17. A vehicle comprising the battery pack according to claim 14.

18. The vehicle according to claim 17, comprising a mechanism configured to convert kinetic energy of the vehicle into regenerative energy.

\* \* \* \* \*